AUTOMATIC TELECOMMUNICATION SWITCHING SYSTEM

Filed Oct. 7, 1966 10 Sheets-Sheet 1

AUTOMATIC TELECOMMUNICATION SWITCHING SYSTEM

AUTOMATIC TELECOMMUNICATION SWITCHING SYSTEM

United States Patent Office 3,505,482
Patented Apr. 7, 1970

3,505,482

AUTOMATIC TELECOMMUNICATION SWITCHING SYSTEM

Dikran Mourad Mouradian, Wilrijk-Antwerp, Belgium, and Bino Lorenzoni, Cinisello Bolsamo, Milano, Italy, assignors to International Standard Electric Corporation

Filed Oct. 7, 1966, Ser. No. 585,151
Claims priority, application Netherlands, Oct. 8, 1965, 6513112
Int. Cl. H04m *3/00;* H04q *3/48*
U.S. Cl. 179—18 11 Claims

ABSTRACT OF THE DISCLOSURE

A telecommunication switching system comprising ot plurality of switching stages. Each stage includes a number of crossbar switches and all of the plurality of stages are controlled by a common marker. The common marker is comprised of a preselection control circuit and a selection control circuit. The preselection control circuit and the selection control circuit are able to perform part of their operations simultaneously thus minimizing the marker utilization time. This minimization of time enables higher traffic to be serviced by the switching system, with a reduced quantity of equipment.

The invention relates to automatic telecommunication switching systems with switching means. Such systems have a plurality of inputs and a plurality of outputs with at least one common control arrangement for controlling the interconnection by said switching means of an input e.g. calling, to an output. The systems further include first connecting means for establishing a connection between said output and a free register, among a plurality of registers, adapted to receive selection information via said calling input. Second connecting means are used for establishing a connection between said free register and a common control arrangement which also controls the interconnection by said switching means of said output to a called input indicated by said selection information.

Such a system is already known. In such known systems the common control circuit is only able to control the interconnection of an input to an output or of an output to an input on a one at a time basis so that, when a plurality of such operations has to be performed, the average waiting time elapsing before such an operation can be performed is relatively long and hence the traffic capable of being handled for a given quality of service is relatively small.

It is therefore an object of the invention to provide a system of the above type, but which enables a considerable reduction in the said average waiting time and accordingly increases the traffic capability of the system.

The present telecommunication switching system is characterized in that said common control arrangement includes a first common control circuit for controlling the interconnection of said calling input to an output and a second common control circuit for controlling the interconnection of output to a said called input. The first and second control circuits are able to perform at least part of their operations simultaneously.

It should be noted that the U.S. Patent 2,912,510 discloses a telecommunication switching system comprising first and second registers intervening during the establishment of an interconnection between an input and an output and between the output and a called input respectively. Such registers do not however fulfil a function comparable to that of the above common control circuit which directly controls the said interconnection.

According to another aspect, the present invention concerns switching stages with *mn* inlets and a plurality of outlets and with switching means for establishing a connection between any of said inlets and any of said outlets under the control of a common control circuit. The switching means includes a set of at most *m* first bistable devices to represent sets of *n* inlets and to control all bistable devices of a set of at most *n* second bistable devices used to represent sets of *m* inlets. Each first bistable device is amendable to marking. A first lock-out circuit is provided for selecting one of the marked first bistable devices and the thus selected first bistate devices control all second bistable devices of the associated set of at most *n* second bistable devices. A second lock-out circuit is provided to select one of the controlled second bistable devices of this set, thus identifying one of said *mn* inlets.

Such a switching stage is already known. In this known switching stage a first bistable device can only be operated under the control of the common control circuit. Moreover the selected first bistable device operates the associated set of at most *n* second bistable devices only in an indirect manner since the first lock-out circuit includes a number of third bistable devices each corresponding to a first bistable device. The first bistable device is capable of selecting one of these third bistable devices which then directly controls all the second bistable devices of the associated set. Hence the operation of the above switching means only starts under the control of the common control circuit and the direct control of the sets of second bistable devices necessitates the subsequent operation of a first and a third bistable device.

It is therefore an object of the invention to provide a switching stage of the above type but which permits to under the control of the common control circuit and start the operation of the switching means before it comes which permits a simpler control of sets of second bistable devices.

The present switching stage is particularly characterized in that a said first bistable device is operated when an inlet of the corresponding set is marked by another circuit and that an operated first bistable device directly controls all the second bistable devices of the associated set.

The above mentioned and other objects and features of the invention will become more apparent and the invention itself will be best understood by referring to the following description of an embodiment taken in conjunction with the accompanying drawings in which.

Although the invention is not limited to such a system an automatic PBX switching system will hereinafter be described, the specific PBX features which do not concern the invention having however been omitted. Moreover, for simplification purposes, only the set up of a local call will be described in detail.

It will be assumed throughout what follows that the switches used for the establishment of a connection consist of crossbar switches or multiselectors of a known type comprising a certain number of individual switches. The selection of a predetermined set of inlets, simply referred to as inlet hereinafter, is effected by means of members called select bars. Each of these select bars is associated with two selection electromagnets and can take two operating positions depending upon the electromagnet energized. On taking one of these positions, the select bar prepares the connection of an individual switch, connected to an outlet, to two inlets. The selection of one of these inlets is effected by causing the operation of one or the other of the two electromagnets associated with a supplementary select bar. If $n$ designates the number of select bars, without counting the supplementary bar, $2n$ selection electromagnets are obtained and two series of inlets can be selected, each comprising $2n$ inlets. The selection of a series of inlets is effected by one of the two electromagnets associated with the supplementary bar; the selection of an inlet within the series is effected by one of the $2n$ selection electromagnets mentioned above. The selection electromagnets only prepare the connection of an individual switch, and hence of an inlet to an outlet, this connection being caused by an operate bar operated by an operating or connecting electromagnet and being held as long as that electromagnet remains energized, regardless of the condition of the selection electromagnet that has prepared the connection.

Figure 1:
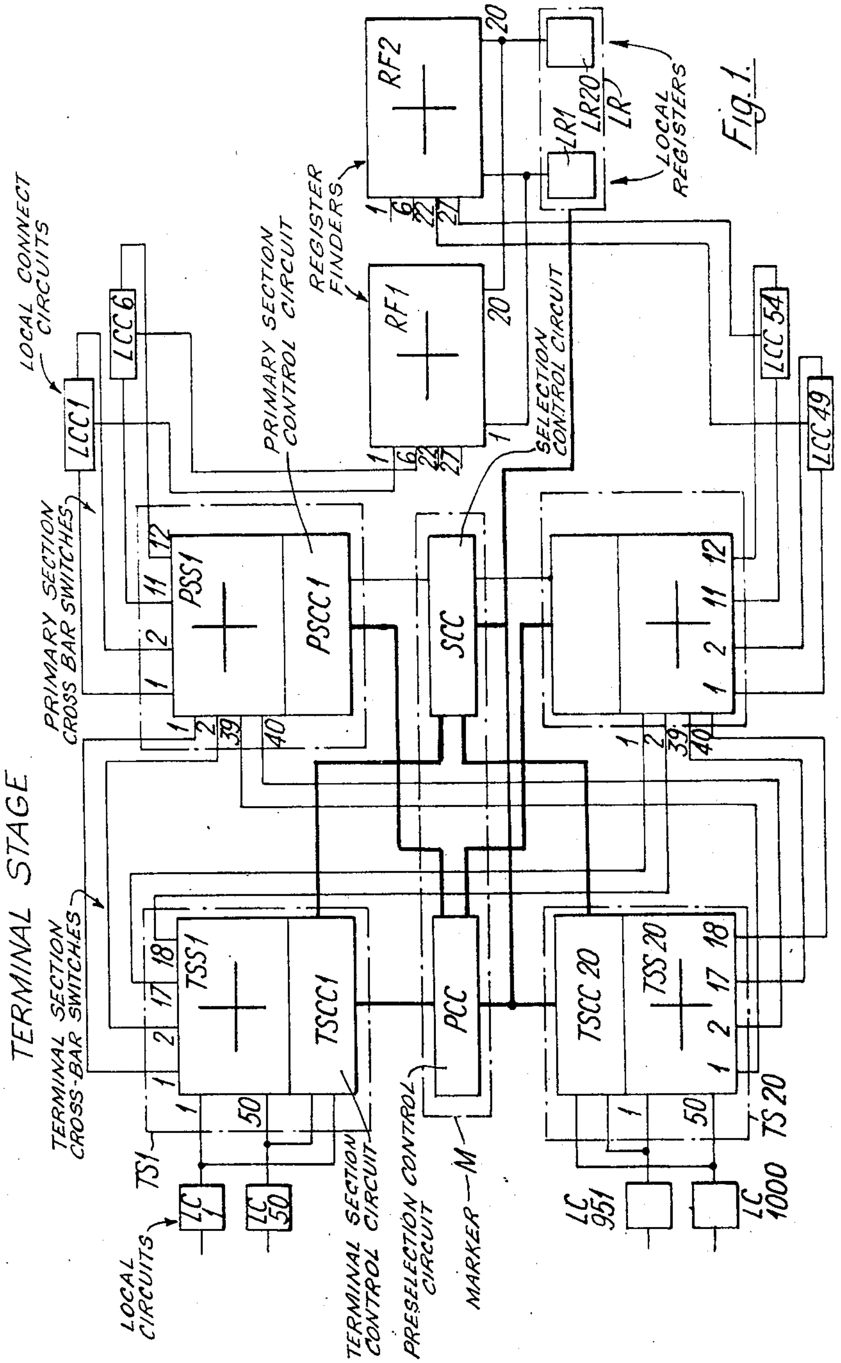
FIG. 1 is a diagram of a two-stage telecommunication switching system according to the invention.

Principally referring to FIG. 1 the two-stage switching means of a PBX-exchange are shown, these means being adapted to handle a traffic of 0.2 Erlang per subscriber. The multiselectors or crossbar switches are each schematically represented by a cross in heavy lines included in a light line rectangle. The horizontal line represents a plurality of select bars, whereas the vertical line represents a plurality of operate bars. The terminal section crossbar switches TSS1 to TSS20 each include 13 select bars, 1 supplementary bar and 19 operate bars and each permit to interconnect any of 50 inlets with any of 18 outlets. The primary section crossbar switches PSS1 to PSS9 each include 13 select bars, 1 supplementary bar and 12 operate bars and each permit to interconnect any of 40 inlets with any of 12 outlets. The register finder crossbar switches RF1 and RF2 each include 13 select bars, 1 supplementary bar and 20 operate bars and each permit to interconnect any of 27 inlets with any of 20 outlets, the 20 outlets of crossbar switch RF1 being paired with the 20 outlets of crossbar switch RF2.

The switching system has access to 1000 subscriber's lines each terminating at a local circuit LC1–1000 individual to that line. These 1000 local circuits LC1 to LC1000 are distributed over 20 groups LC1–50 to LC951–1000, the 50 circuits of these 20 groups being connected to the 50 inlets of a respective one of the 20 terminal section cross-bar switches TSS1–20 which are connected to the primary section crossbar switches PSS1–9 in such a manner that each terminal crossbar switch has access to each primary section crossbar switch via two links. The pairs of outlets of the latter crossbar switches PSS1–9 are each connected to a local connecting circuit LCC1–54. With the above interconnection scheme it is clear that each local circuit LC1–1000 has access to all the 54 local connecting circuits LCC1–54 via one of the terminal section crossbar switches TSS1–20 and one of the primary section crossbar switches PSS1—9. These 54 local connecting circuits LCC1 to LCC54 are connected to the inlets of the register finder crossbar switches RF1 and RF2, hereinafter referred to as the register finder RF1–2, so that each local connecting circuit LCC1–54 has access to any of the 20 local register circuits LR1–20 which are connected to the 20 paired outlets of these register finder crossbar switches RF1 and RF2. The crossbar switches TSS1–20 are each associated to an individual control circuit TSCC1–20 and likewise the crossbar switches PSS1–9 are each associated to an individual control circuit PSCC1–9. A terminal section crossbar switch TSS1–20 and its associated individual control circuit TSCC1–20 forms a so called terminal section TS1–20, whereas a primary section crossbar switch PSS1–9 and its associated individual control circuit PSCC1–9 forms a primary section PS1–9. The above mentioned 10 groups of 50 local connecting circuits LC1–50 to LC951–1000 are connected to the terminal section control circuits TSCC1–20 respectively.

The switching system also includes a common control arrangement or marker circuit M constituted by a first or preselection control circuit PCC and a second or selection control circuit SCC. The preselection control circuit PCC may be connected to the selection control circuit SCC, to the terminal section control circuits TSCC1–20, to the primary section control circuits PSCC1–9 and to the local register circuits LR1–20. In its turn, the selection control circuit SCC may be connected to the preselection control circuit PCC, to the terminal selector control circuits TSCC1–20, to the primary section control circuits PSCC1–9 and to the local register circuits LR1–20. These connections may be established via wires represented in heavy lines.

It should be noted that for handling outgoing calls the terminal selectors are also provided with outlets (not shown) giving access to trunk connecting circuits but these are not shown since only local calls are considered.

Before describing in detail a preselection and a selection operation, these operations will be briefly disclosed hereinafter.

First the preselection operation is considered. One or more of the subscriber lines may be in the calling condition, these calling conditions being registered via the corresponding local circuits in the control circuits of the corresponding terminal sections. These calling terminal sections are signalled to the preselection control circuit PCC which selects, according to a variable priority, one of these calling terminal sections on condition that the latter section may be connected to a primary section via at least one free link. The PCC makes the inventory of all primary sections which have at least simultaneously one free link to the selected calling terminal section and one free local connecting circuit having itself access to a free register. The PCC selects, according to a variable priority, one of the primary sections fulfilling these conditions. Afterwards it starts the connection of a free local connecting circuit, to which the selected primary section has access, to a free register circuit. Simultaneously, if such a free register is available, the PCC blocks the selection control circuit SCC which would try to start its so called active or switching phase. The above control operation of the PCC is its so called passive or preparation phase. If this SCC is not yet in its active or switching phase the PCC starts its active or switching phase, whereas if the SCC is already in its active phase PCC is blocked until the SCC is released. During its so called active phase the PCC simultaneously controls the selected terminal section to prepare the operation of the horizontal select and supplementary bars giving access to the calling line, and the selected primary section to prepare the operation of the horizontal select and supplementary bars giving access to the selected terminal section via the free link. These bars are then operated and both the selected terminal and primary sections afterwards inform the PCC about the effective operation of the horizontal select and supplementary bars giving access to this calling line and this free link. The terminal section informs the PCC about the category of the calling line. In the meantime, in the selected primary section the local connecting circuit is connected to a free register circuit via the register finder. The PCC then controls via the engaged register and the engaged local connecting circuit the operation of a vertical operate bar of the selected primary section and afterwards via the selected link the operation of a vertical operate bar of the selected terminal section. The PCC then informs the register about the category of the calling party and the selected primary section informs the PCC about the operation of these vertical bars. The preselection operation being finished, the PCC is disconnected from the register and becomes available for another preselection operation.

It should be noted that after the calling line and the register have been interconnected the called line number dialled by a subscriber is stored in this register.

Second the selection operation is considered. One or more of the registers LR1–20 may be in the calling condition i.e. have a called subscriber's number stored. All these calling registers are signalled to the selection control circuit SCC which selects, according to a variable priority, one of these calling registers. The selected register sends all information concerning the called line to the SCC which decodes this information in order to know, first the terminal section to which the called line belongs, secondly the horizontal select bar corresponding to this called line in this terminal section, and third the horizontal supplementary bar corresponding to this called line in this terminal section. The SCC blocks the PCC which would try to start its so called active phase. If this PCC is not yet in its active phase the SCC starts its active phase, whereas if the PCC is already in its active phase the SCC is blocked until the PCC is released. During its so called active phase the SCC simultaneously controls the selected terminal section to control the operation of the horizontal select and supplementary bars giving access to the called line, and the primary section already seized during the preselection operation to prepare the operation of the horizontal select and supplementary bars giving access via a free link to the selected terminal section. These bars are then operated and afterwards the selected terminal section informs the register via the SCC whether the called line is free or busy and both this terminal section and the selected primary section inform the SCC about the effective operation of the horizontal select and supplementary bars giving access to the called line and the free link. The register decides whether the selection is to be continued or not depending on the called line condition (free or busy) and also upon the calling line condition. If the selection operation must be continued the register controls the operation of a vertical operate bar in the selected primary section and afterwards via the selected link the operation of a vertical operate bar in the selected terminal section. The primary section then informs the SCC about the effective operation of these vertical bars. The selection operation being finished, the SCC is disconnected from the register and becomes available for another selection operation.

Figure 2:
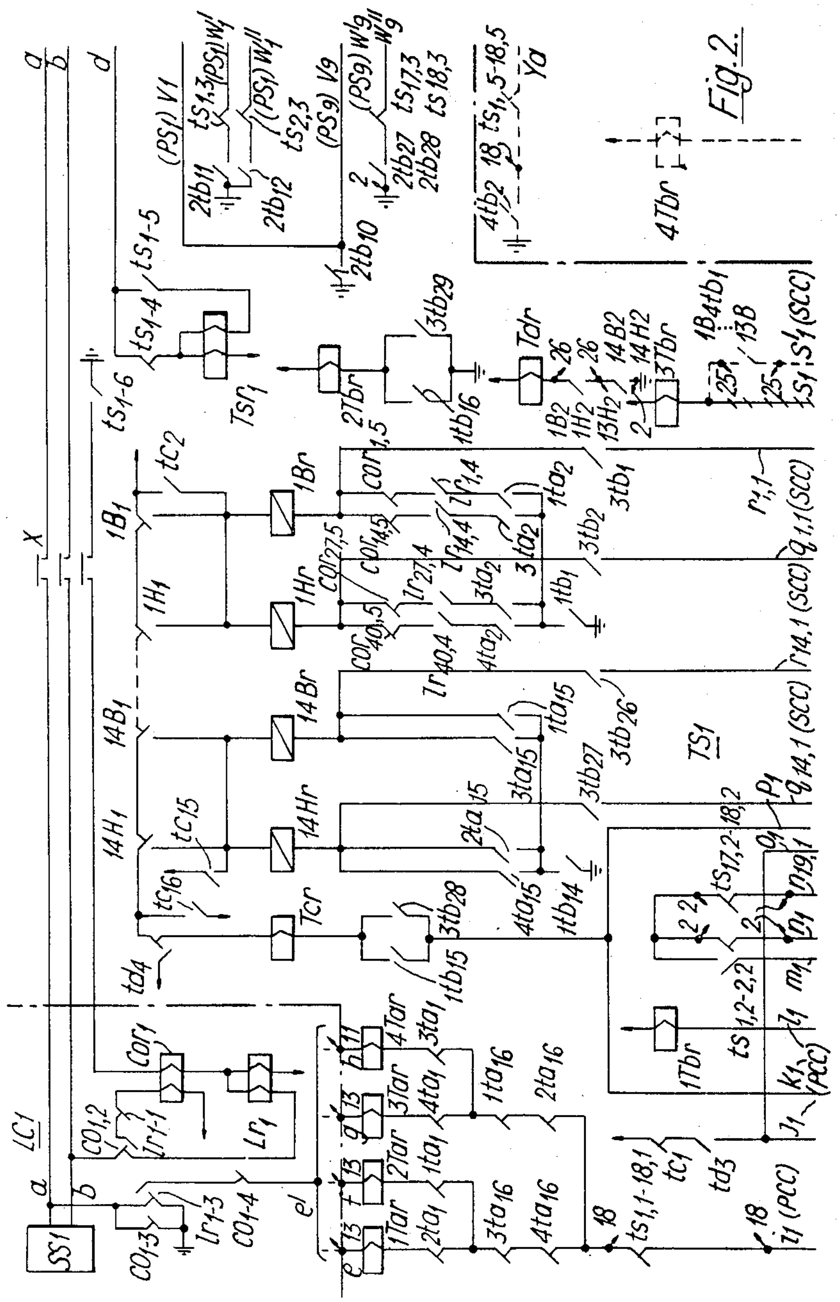
FIG. 2 represents a local subscriber's circuit and a terminal section forming part of this system.
Figures 3, 4:
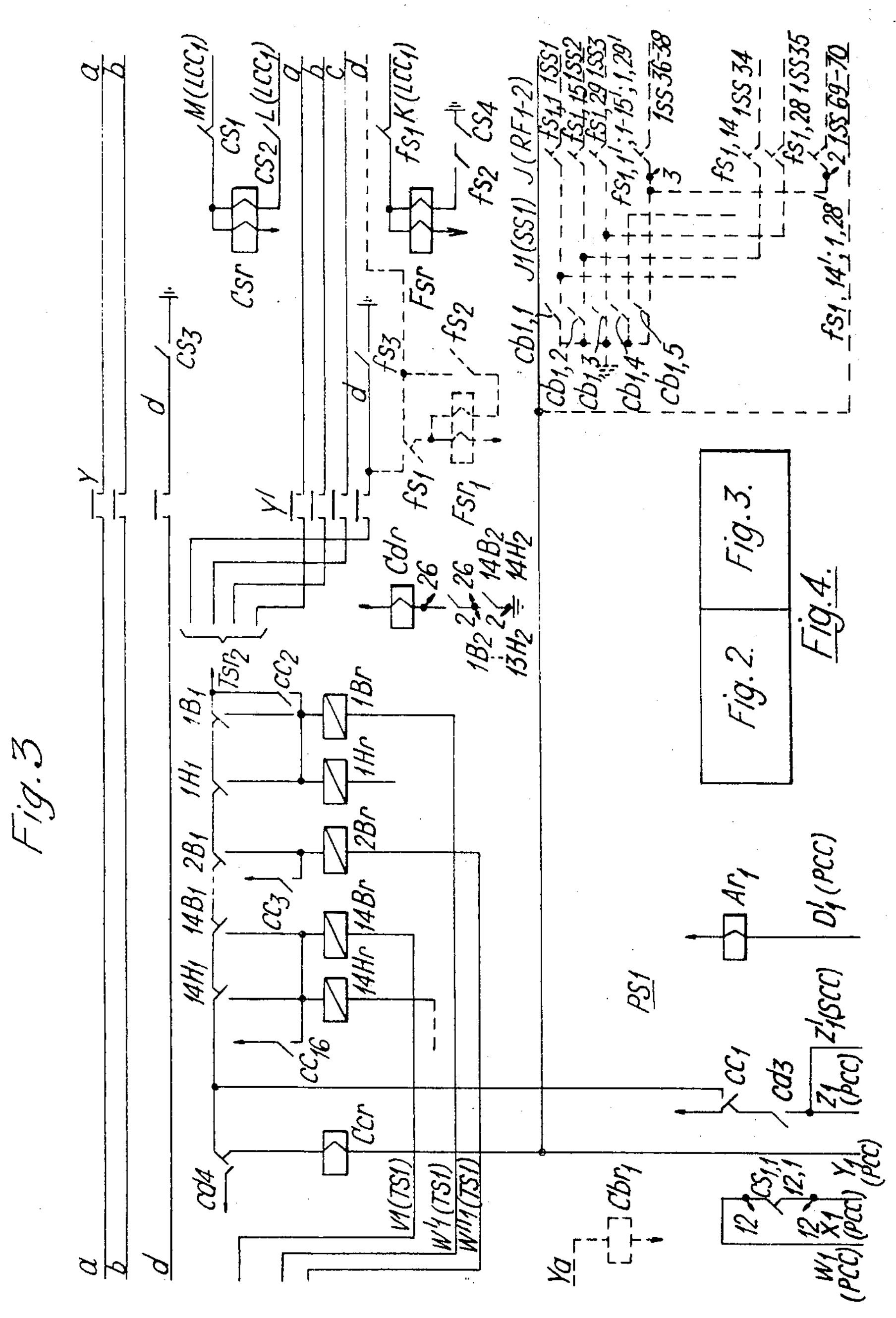
FIG. 3 shows a primary section also forming part of this system.
FIG. 4 shows how FIGS. 2 and 3 have to be assembled.
Figure 5:
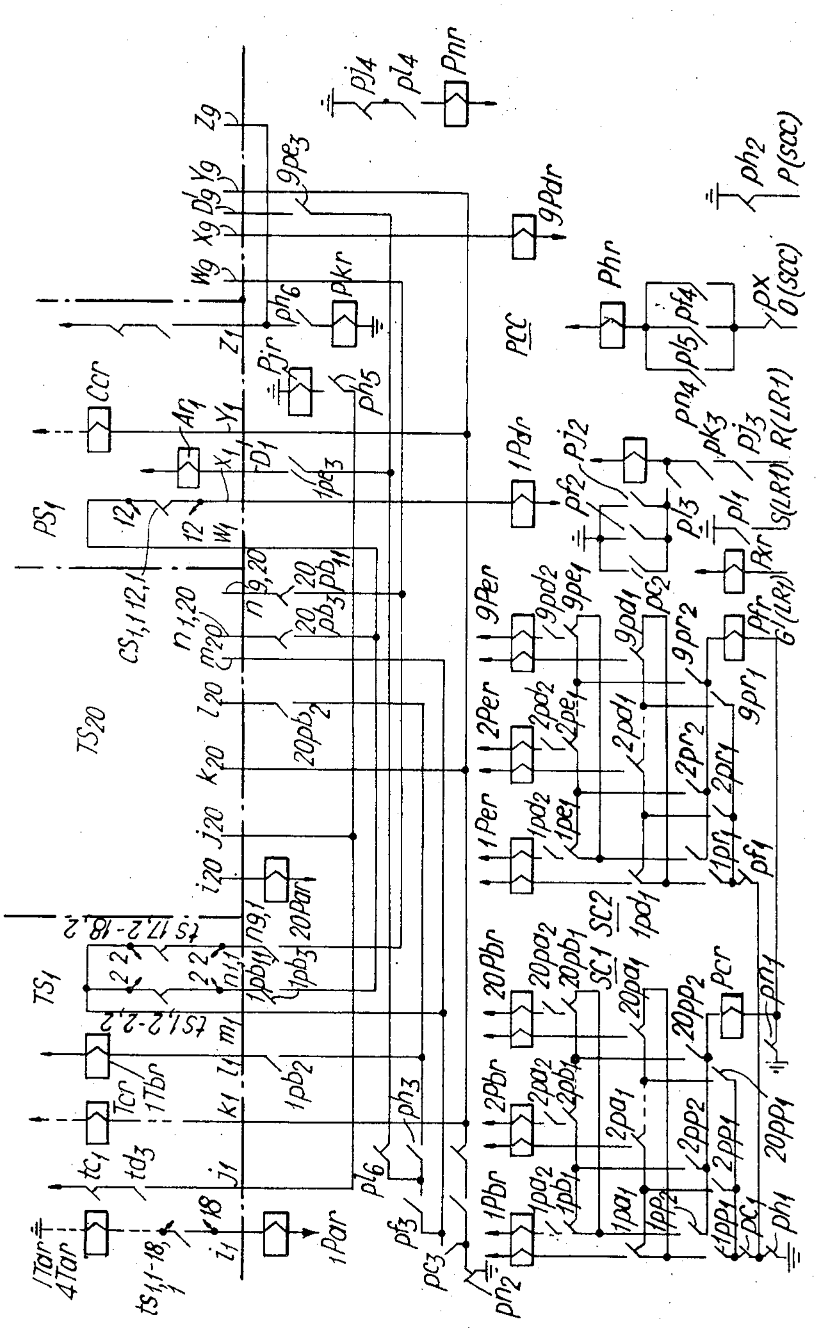
FIG. 5 represents a preselection control circuit included in the system of FIG. 1, and some of its connections with the terminal and primary sections.
Figure 6:
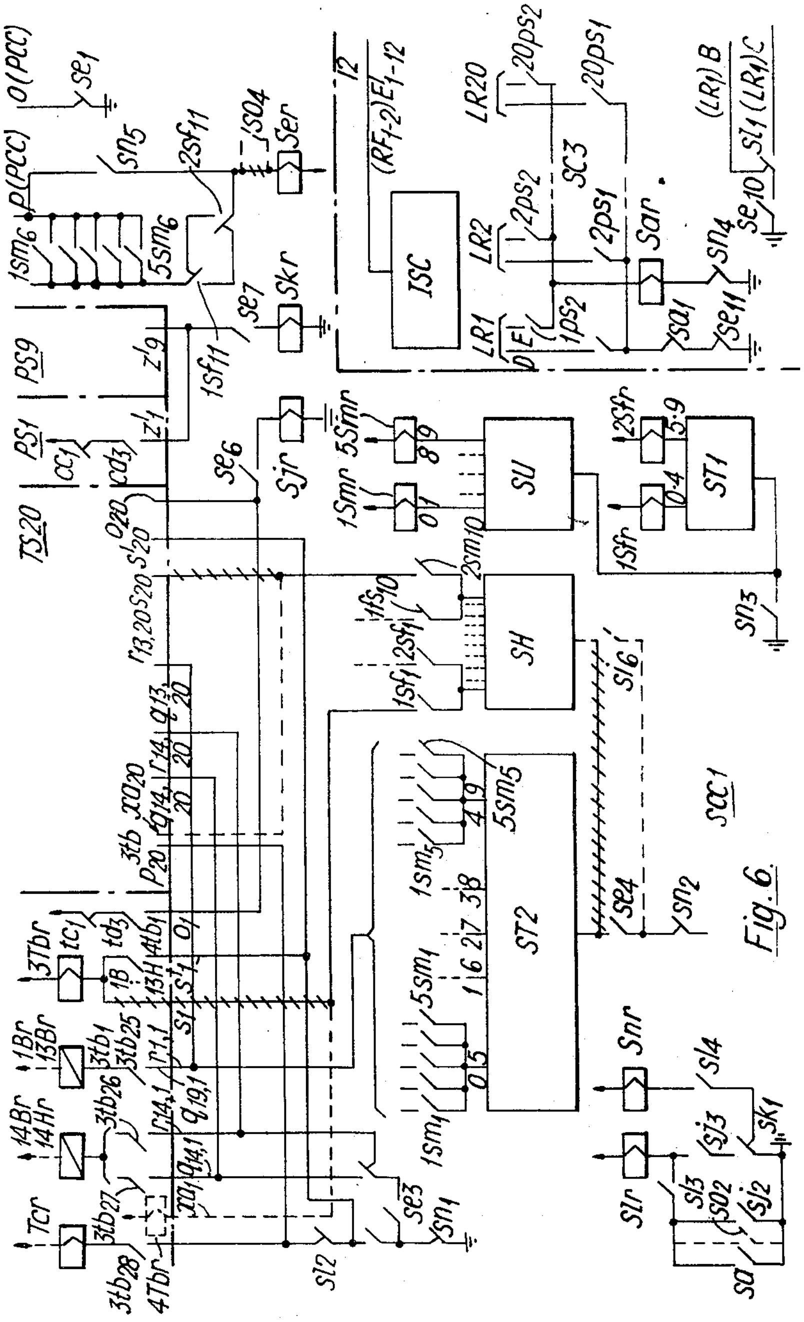
FIG. 6 shows a selection control circuit included in the system of FIG. 1, and some of its connections with the terminal and primary sections.
Figure 7:
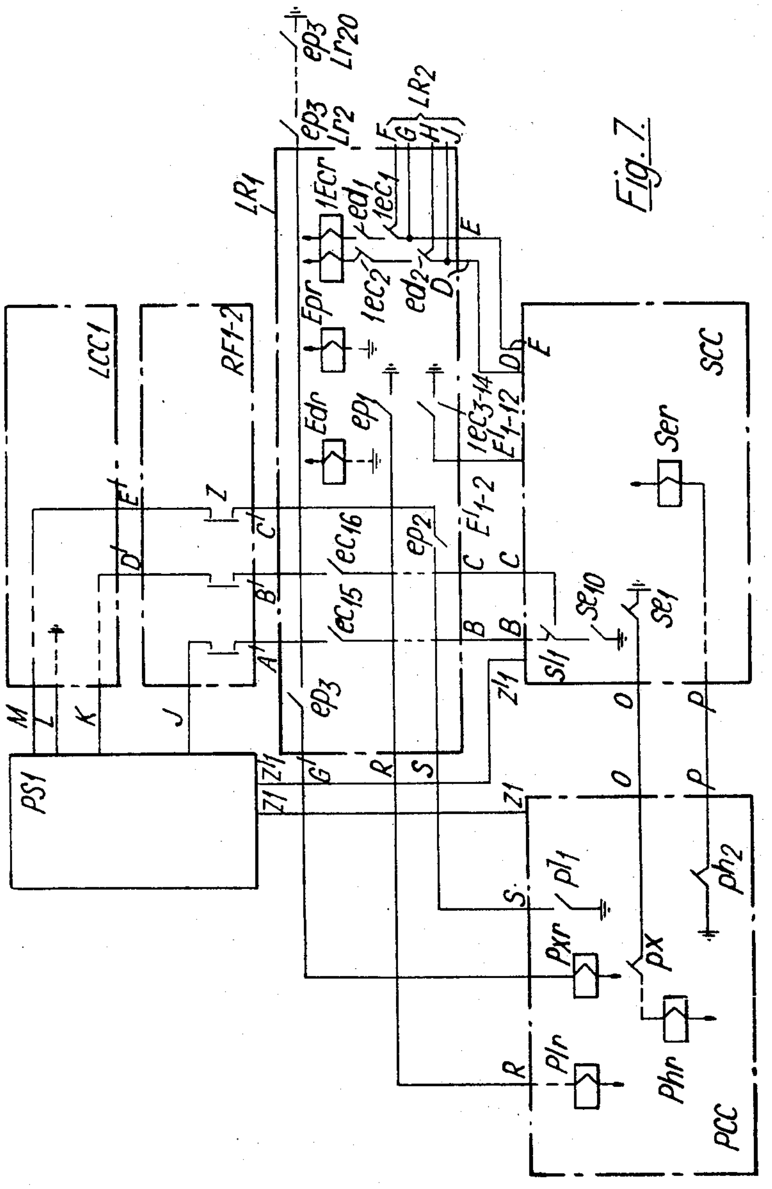
FIG. 7 represents connections between the preselection and selection control circuits and other parts of the switching system according to the invention.

Principally referring to FIGURES 1 to 7 the above preselection and selection operations are described in detail hereinafter. Hereby it should be noted that the elements of FIGS. 2, 3 and 6 represented in dotted lines should not be reckoned with, whereas the lines cut by oblique stripes must be considered as constituting connections.

First the preselection is described in detail. When one of the 1000 subscribers lifts his telephone handset the line relay L*r* included in his local circuit is energized. For instance when the subscriber connected to the local circuit LC1 lifts his telephone handset the relay L*r*1 (FIG. 2) is energized as follows: battery right and left hand windings of relay L*r*1, contact *co*12 of cut-off relay C*or*1, wire *b*, gravity switch of telephone handset SS1 of the calling subscriber, wire *a*, contacts *co*1, 3 and *lr*1, 3 in parallel, ground.

By the closure of contact *lr*1, 4 the corresponding electromagnet *l*B*r* (FIG. 2) controlling the horizontal bar giving access to the calling line is prepared for operation.

By the change of position of contact *lr*1, 3 of relay L*r*1 a ground is connected to wire *e'* via contact *co*1, 4 of cut-off relay C*or*1. It should be noted that the 50 wires *e'* of the 50 local circuits connected to a same terminal section are grouped in three groups of 13 and one group of 11, the outlets of these groups being connected to the respective leads *e, f, g, h* leading to the windings of respective relays 1T*ar* to 4T*ar* included in this terminal section.

Due to wire *e'* of LC1 being connected to wire *e* of TS1 the following circuit is closed for the relay 1T*ar* of TS1: ground in LC1, contacts *lr*1, 3, *co*1, 4, lead *e'* to TS1, lead *e* winding of relay 1T*ar*, contacts 2*ta*1, 3*ta*16, 4*ta*16 forming part of a lock-out circuit, parallel connected contacts *tss*1, 1–18, 1 of electromagnets T*sr*1–18, wire *i*1 to PCC, winding of relay 1P*ar* (FIG. 5), battery.

The electromagnets T*sr*1 to T*sr*18 are those controlling the operation of the 18 vertical or operate bars of the crossbar switch TSS1. When such an electromagnet T*sr*1–18 is operated its contact *ts*1, 1–18, 1 is open, whereas this contact is closed when the electromagnet is released. The closed or open position of these contacts hence also indicates the free or busy condition of the 18 links interconnecting the terminal section crossbar switch TSS1 and the primary section crossbar switches PSS1–9, since these links are connected to the 18 outlets of TS1 and are controlled by the 18 vertical bars thereof. Consequently the above relays 1T*ar* and 1P*ar* are only energized when at least one of the links between TSS1 and PSS1–9 is free, the operated relay 1P*ar* indicating that the terminal section TS1 is in the calling condition.

It should be noted that a plurality of subscriber's lines connected to the terminal section TS1 may be in the calling condition, so that more than one of the relays 1T*ar* to 4T*ar* may try to operate. Only one of these relays will however remain energized due to the existence of a lock-out circuit formed by the contacts 1*ta*1; 1*ta*16; 2*ta*1; 2*ta*16; 3*ta*1; 3*ta*16; 4*ta*1 and 4*ta*16. The operated one of the relays 1T*ar*–4T*ar* of TS1 prepares the operation of the corresponding set of electromagnets 1B*r*–13B*r*, 14B*r*; 1B*r*–13B*r*, 14H*r*; 1H*r*, 13H*r*, 14B*r*; 1H*r*–13H*r*, 14H*r*.

Also subscriber's lines connected to the other terminal sections TS2–20 may be in the calling condition, so that for these lines a relay of the group 1T*ar*–4T*ar* included in this section may be energized in series with the corresponding relay 2P*ar*–20P*ar* (FIG. 5) of the PCC.

The PCC selects according to a variable priority a single one of the calling terminal sections by means of the lock-out circuit SC1 which is controlled by a priority distributor circuit (not shown) permitting to count 20 and including 20 relays 1P*pr* to 20P*pr* of which only the contacts 1*pp*1–2 to 20*pp*1–2 are represented. This priority distributor is stepped into its following position after each preselection operation. The lock-out circuit SC1 includes 20 relays 1P*br* to 20P*br* the left hand windings of which are coupled to the make contacts of the change-over contacts 1*pa*1 to 20*pa*1 of the respective relays 1P*ar* to 20P*ar*. The junction points of the series connected break contacts of these changeover contacts 20*pa*1, 1*pa*1, . . . ,19*pa*1 are each coupled to ground via an individual contact 1*pp*1–20*pp*1 of the relays 1P*pr* to 20P*pr* of the distributor circuit and the break contacts *pc*1 and *ph*1 of relays P*cr* and P*hr* respectively. In an analogous manner the break contacts of the change-over contacts 20*pb*1, 1*pb*1, . . . , 19*pb*1 of the relays 20P*br*, 1P*br* . . ., 19P*br* are connected in series and the junction points of these break contacts are connected to ground via an individual contact 1*pp*2–

20pp2 of the above relays 1Ppr to 20Ppr, the winding of relay Pcr and break contact pn1. The make contacts of the changeover contacts 1pb1 to 20pb1 are each connected to a battery via a contact 1pa2–20pa2 of a relay 1Par-20Par and a right hand winding of a relay 1Pbr–20Pbr.

When for instance the relays 1Par of terminal section TS1 and 20Par of terminal section TS20 are energized and when the distributor circuit is in its first position, i.e. relay 1Ppr operated, relay 1Pbr is energized as follows: battery, left hand winding of relay 1Pbr, contacts 1pa1, 1pp1, pc1, ph1, ground. Relay 20Pbr is prevented from being energized due to its operating circuit being opened in 1pa1. Relay 1Pbr is locked in the following circuit: battery, right hand winding or relay 1Pbr, contacts 1pa2, 1pb1, 1pp2, winding of relay Pcr, contact pn1, ground.

Consequently relay Pcr is energized; thus it is indicated in PCC that the terminal section to which a calling line is connected has been selected, this selected terminal section having access to at least one of the primary sections PS1–9 via a free link since at least one of the break contacts ts1, 1–18, 1 is closed.

Due to the operation of relay 1Pbr, which closes its contacts 1pb3 to 1pb11, and of relay Pcr which closes its contact pc3, the following circuit is established: ground in PCC, contacts pn2 and pc3, lead m1 to terminal section TS1, 18 contacts ts1, 2 to ts18, 2 of the above electromagnets Tsr1 to Tsr18 controlling the vertical bars of TSS1, these contacts being connected in parallel per pair and connected to the PCC via the 9 leads n1, 1–9, 1, 9 contacts 1pb3–11, 9 wires w1–9 leading to PS1–9 respectively and each connected in the corresponding primary section to 12 parallel connected contacts of the 12 electromagnets controlling the vertical bars of the crossbar switch included in this section e.g. break contacts cs1, 1–12, 1 of the electromagnets Csr1–12 of PS1, 9 wires x1–9 to PCC, 9 windings of relays 1Pdr–9Pdr, batteries.

In the same manner as the contacts ts1, 1–18, 1 the closed and open positions of the break contacts ts1, 2 to ts18, 2 indicate the respective free and busy conditions of the 18 links interconnecting the terminal section TS1 and the primary section PS1–9. Also the closed and open position of the above break contacts such as cs1, 1–12, 1 of the 12 electromagnets controlling the vertical bars of a primary section indicate the respective free and busy conditions of the 6 local connecting circuits associated to the outlets controlled by these bars.

Hence when a relay 1Pdr–9Pdr is energized in the above circuit this means that the associated primary section PS1–9 has simultaneously access to the selected terminal section TS1 via at least one free link and to at least one free local connecting circuit. The PCC has hence made an inventory of all the primary sections fulfilling these conditions.

The PCC selects according to a variable priority a single one of these primary sections by means of a lockout circuit SC2 which is completely analogous to SC1 and is therefore not described in detail. This circuit is also controlled by a priority distributor (not shown) permitting to count 9 and including relays 1Prr to 9Prr of which only the contacts 1pr1–2 to 9pr1–2 are represented. The priority distributor is stepped into its following position after each preselection operation. When it is supposed that relay 1Pdr is energized and that the priority distributor is in its first position, the relay 1Per is operated in the following circuit; battery, left hand winding of relay 1Per, contacts 1pd1, 1pr1, pf1, ph1, ground.

The relay 1Per is locked as follows: battery, right hand winding of relay Per, contacts 1pd2, 1pe1, 1pr2, winding of relay Pfr, contact pn1, ground. Consequently relay Pfr is energized; thus it is indicated that a primary section, namely PS1, having access to the terminal section TS1 and a free local connecting circuit has been selected. Relay Ar1 in the selected primary section PS1 is then operated in the following circuit: ground in PCC, contacts pn2, pc3, pf3, pl6, pe3, lead D'1 to PS1, winding of relay Ar1, battery. Thus the primary section PS1 is informed that it should start the connection of a free local connecting circuit of the group LCC1–6 to a free register of the group LR1–20 via the register finder RF1–2. This operation will not be described since this does not form part of the invention but it should be noted that the free condition of a register is indicated by the relay Epr (FIG. 7) thereof being not operated and hence by make contact ep3 being not closed. All the make contacts ep3 of the registers LR1–20 are connected in series, and contact ep3 of LR20 is connected to a ground, whereas contact ep3 of LR1 is connected to a battery via a lead G' leading to PCC and the winding of a relay Pxr. Hence relay Pxr is only operated when none of the registers LR1–20 is free. It is supposed that at least one register is free so that relay Pxr is not in the operative condition and that consequently break contact px is closed.

Instead of proceeding as described above one could also check that a free primary section has access to a free register via a free local connecting circuit and the register finder. In the present case this is not necessary since the local connecting circuits LCC1–54 have access to all the local registers LR1–20.

The following circuit is now established: battery in PCC, winding of relay Phr, contacts pf4 and px, lead O to the selection control circuit SCC, break contact se1 of relay Ser (FIG. 7), ground.

When the SCC is not in its active phase, as it is supposed, relay Ser is not operated so that relay Phr is then energized in the last circuit. Due to this and more particularly by the opening of break contact ph2, relay Ser in the SCC is then prevented from being energized via lead P, so that the SCC is blocked.

By the operation of relay Phr the PCC starts its active phase.

In the selected terminal section TS1 relay 1Tbr is energized in the following circuit: battery, winding of relay 1Tbr, lead l1 to PCC, contacts 1pb2, ph3, pf3, pc3, pn2, ground.

By the closure of the make contacts 1tb1 to 1tb14 of relay 1Tbr and due to the make contacts 1ta2 to 1ta15 of relay 1Tar being already closed, the electromagnets 1Br, 2Br, . . . , 14Br controlling the select and supplementary bars of TSS1 are prepared for operation. The following circuit is established by the closure of contact 1tb15: battery in TS1, a lock-out circuit formed by the contacts 1B1, 1H1, . . . , 14B1, 14H1 of the respective electromagnets 1Br, 1Hr, . . . , 14Br, 14Hr controlling the horizontal select and supplementary bars of crossbar switch TSS1, contact td4, winding of relay Tcr, contact 1tb15, lead k1 to PCC, contacts pl2, ph4, pn2, ground. The relay Tcr is hence energized if all the above horizontal bars are in their rest position. By the closure of make contact 1tb16 in TS1 relay 2Tbr is energized as follows: battery, winding of relay 2Tbr, contact 1tb16, ground.

By the closure of contacts 2tb11 to 2tb28 in TS1 a ground is applied via contacts ts1,3; ts2,3 . . ., ts17,3; ts18,3 of the above electromagnets Tsr1–18 of TS1 and leads w'1, w''3, . . . w'9, w''9 to two electromagnets, controlling two adjacent select bars, in each of the primary sections PS1–9. For instance a ground is applied via contacts 2tb11–12, ts1,3–2,3 and leads w'1, w''1 to the one end of the windings of the electromagnets 1Br and 2Br respectively. The selected terminal section TS1 indeed has access to two adjacent inlets of the preselected primary section PS1 via two links. These two adjacent inlets may each be connected to any one of the 12 outlets of PS1 by the operation of the horizontal select bar associated to this inlet followed by the operation of a vertical operate bar associated to this outlet. These select bars are controlled by the electromagnets 1Br and 2Br respectively and the above two inlets are selected among the 40 possible inlets by means of the electromagnet 14Br controlling the supplementary bar. By the closure of contact 2tb10 in TS1 a ground is applied via leads v1 to v9 to one of the two electromagnets controlling the supplementary bar of the crossbar switches PSS1–9 included in the primary sections PS1–9. For instance this ground is applied via lead v1 to one end of the winding of the electromagnet 14Br controlling the supplementary bar of the crossbar switch PSS1.

The following circuit is established in PS1: battery in PS1, a lock-out circuit formed by the contacts 1B1, 1H1, . . . 14B1, 14H1 of the respective electromagnets 1Br, 1Hr, . . . 14Br, 14Hr controlling the horizontal bars of crossbar switch PSS1, contact cd4, winding of relay Ccr, lead y1 to PCC, contacts pl1, ph4, pn2, ground. The relay Ccr is hence energized in this circuit if all the above horizontal bars are in their rest position.

First the terminal section TS1 is now considered further. The operated relay Tcr is locked via contact tc16, and by the closure of the contacts tc2–15 the upper ends of the windings of the electromagnets 1Br to 14Hr are connected to a battery. In the selected terminal section TS1 a plurality of the 50 lines may be in the calling condition i.e. have their line relay Lr1–50 energized and their cut-off relay Cor1–50 released. As mentioned above a selection of a group among the groups of 13 or 11 lines has already been made by the operation of relay 1Tar. But in such a selected group there may still be a plurality of calling lines. For these lines the associated select electromagnet 1Br, 2Br, . . . 13Br tries to energize via a contact tc2–15, its closed cut-off relay contact, its closed line relay contact, a contact 1ta2–15 and a contact 1tb1–14. For instance, as it is supposed that the first line of TS1 is in calling condition, select electromagnet 1Br is energized in the following circuit: battery, contact tc2, winding of electromagnet 1Br, contact Cor1,5 of cut-off relay Cor1, contact 1r1,4 of line relay Lr1, contacts 1ta2 and 1tb1, ground. Electromagnet 1Br is locked via its contact 1B1 which opens the operating circuit for the other electromagnets of the group 2Br, 3Br, . . . 13Br; electromagnet 14Br controlling the supplementary horizontal bar of TSS1 is operated as follows: battery in TS1, contact tc15, winding of electromagnet 14Br, contacts 1ta15 and 1tb14, ground. By the operation of electromagnets 1Br and 14Br of crossbar switch TSS1 the horizontal select bar and the supplementary horizontal bar of this switch giving access to the calling local circuit LC1, are both operated.

After the operation of the electromagnets 1Br and 14Br the TS1 informs the PCC about the category of the calling line. This operation is not described since it does not form part of the invention.

By the closure of contacts 1B2 and 14B2 of these electromagnets, the relay Tdr is energized as follows: battery, contacts 1B2 and 14B2, ground. By the change of position of contact td4, relay Tcr is released, but electromagnet 14Br remains energized via contacts 14B1, 14H1, and td4.

Relay Pjr in the PCC is then operated as follows: battery in TS1, contacts tc1, td3, lead j1 to PCC, contact ph5, winding of relay Pjr, ground. The operated relay Pjr indicates in the PCC that a horizontal bar giving access to the calling line has been operated in the selected terminal section, i.e. TS1.

The primary section PS1 is now considered. Therein the electromagnet 1Br is energized as follows, when it is supposed that both the electromagnets Tsr1 and Tsr2 in TS1 are in the released condition: battery in PS1, contact cc2, winding of electromagnet 1Br, lead w'1 to TS1 contacts ts1, 3 of electromagnet Tsr1 and 2tb11 of relay 2Tbr, ground. This electromagnet 1Br is locked through its contact 1B1. The electromagnet 14Br is energized in the following circuit: battery in PS1, contact cc16, winding of electromagnet 14Br, lead v1 to TS1, contact 2tb10, ground. By the operation of electromagnets 1Br and 14Br of crossbar switch PSS1, the first horizontal select bar and the horizontal supplementary bar thereof are both operated, this select bar giving access to an outlet of the crossbar switch TSS1 via a free link.

By the closure of contacts 1B2 and 14B2 of these electromagnets relay Cdr is energized as follows: battery in PS1, contacts 1B2 and 14B2, ground. By the change of position of contact cd4 relay Ccr is released, but electromagnet 14Br remains energized via contacts 14B1, 14H1 and cd4. Relay Pkr in the PCC is then operated as follows: battery in PS1, contacts cc1 and cd3, lead m1 to PCC, contact ph6, winding of relay Pkr, ground. The operated relay Pkr indicates in the PCC that a horizontal bar has been operated in the selected primary section, i.e. PS1.

In the meantime a local connecting circuit to which PS1 has access has been connected to a free register via the register finder RF1–2 in a not shown but obvious manner. It is supposed that the local connecting circuit LCC1 to which the primary section PS1 has access has been connected to the free register LR1 via the cross bar switch contacts Z (FIG. 7) of the register finder RF1–2 which is also directly connected to PS1 via contact Z and lead J. The seizure of this register LR1 is indicated by the operation of the relay Epr thereof, as already mentioned above. By the closure of make contact ep1 in LR1 relay Plr in PCC is energized as follows: ground at contact ep1 in LR1, lead R to PCC, contacts pj3 and pk3, winding of relay Plr, battery. Relay Plr indicates in PCC that a horizontal bar has been operated in the selected TS1 and PS1 and that local register LR1 has been connected to a free local connecting circuit. This relay Plr is locked via contact pl3 connected in series with the parallel contacts pj2, pf2, pc2. By the closure of make contact pl1 in the PCC the following circuit is established; ground in PCC, contact pl1, lead S to LR1, contact ep2, lead C' to register finder RF1–2, contact Z, lead E' to local connecting circuit LCC1, lead M to PS1, contact cs1 of the electromagnet Csr controlling the vertical bar giving access to the free local connecting circuit LCC1, left hand winding of electromagnet Csr, battery. The electromagnet Csr operates the last mentioned vertical bar in PS1 due to which the crossbar switch contacts Y are closed. Thus the local register LR1 is connected to the calling TS1 via LCC1, PS1 and a free link extending between an inlet of PSS1 and an outlet of FSS1. Electromagnet Csr is locked as follows: battery, left hand (low impedance) and right hand (high impedance) windings of electromagnet Csr in series, contact cs2, lead L to LCC1, ground in LCC1 via not shown contacts. By the closure of make contact cs3 a ground is connected to wire d of the above link, due to which the electromagnet Tsr1 is energized in the following circuit: ground in PS1, contact cs3, crossbar switch contact Y, wire d of link to TS1, contact ts1,4 of Tsr1, left hand low impedance winding of electromagnet Tsr1, battery. Electromagnet Tsr1 is locked via its right hand high impedance winding and its contact ts1,5. This electromagnet Tsr1 operates the vertical bar of crossbar switch TSS1 having access to the outlet already connected to the crossbar switch contacts Y of PSS1, due to which the crossbar switch contacts X (FIG. 2) are closed. Consequently, a connection is established between this outlet and the inlet leading to LC1.

A path is hence established from the calling subscriber's handset SS1 in LC1 to the local register LR1 via the speech wires a, b and through the crossbar switch contacts X and Y, the local connecting circuit LCC1 and crossbar switch contacts Z of the register finder RF1–2.

The PCC then informs the register about the category of the calling party in a manner not further described since this does not form part of the invention.

Relay Cor1 in LC1 is then energized as follows: ground in TS1, contact ts1,6 of Tsr1, crossbar switch contact X, right hand windings of relays Cor1 and Lr1 in series, battery.

The operation of relay C*or*1 initiates the release of the operated relays of PS1 and TS1. When relay P*jr* of PCC is released, relay P*lr* is still operated so that relay P*nr* of PCC is then operated in the following circuit: battery, winding of relay P*nr*, contacts *pl*4 and*pj*4, ground. The operated relay P*nr* indicates in the PCC that the vertical bars in the selected terminal and primary sections have been operated and that the preselection operation is finished.

All the relays and electromagnets of TS1 and PS1 and PCC except the electromagnets T*sr*1 and C*sr*, are finally released and the PCC is disconnected from the register LR1. It should be noted that P*hr* is the last relay to release, the closure of break contact *ph*2 indicating that the PCC is again available for another preselection operation and permitting the operation of relay S*er* which when operated starts the active phase of the SCC.

After the calling subscriber SS1 has been connected to register LR1 the digits dialed by this subscriber are registered therein. When this operation is finished relay E*dr* of register LR1 is energized in a not shown manner.

The selection operation is described in detail hereinafter. Due to the relay E*dr* being energized in the register LR1 the left hand winding of relay 1E*cr* is connected to the selection control circuit SCC via contacts 1 *ec*2 and *ed*2 and lead D. Other registers of the group LR2–20 may have registered a called subscriber's number and have the left hand winding of their relay 2E*cr*–20E*cr* (not shown) connected to the SCC. These various relays 1E*cr*–20E*cr* form part of a lock-out circuit SC3 similar to SC1 and SC2, the distributor circuit forming part of the SCC and including contacts 1*ps*1–2, . . . , 20*ps*1–2 of relays 1P*sr*–20P*sr* (not shown). By this lock-out circuit in one of the 20 possible calling registers the associated relay 1E*cr*–20E*cr* is energized and locked in series with relay S*ar*. It is supposed that register LR1 is the selected one, relay 1E*cr* of LR1 being operated as follows: battery, left hand winding of relay 1E*cr*, contacts 1E*c*2, *ed*2, lead D to SCC, contacts 1*ps*1, *sa*1, *se*11, ground. Relay 1E*cr* is locked in the following circuit: battery, right hand winding of relay 1E*cr*, contacts *ed*1, 1*ec*1, lead E to SCC, contact 1*ps*2, winding of relay S*ar*, contact *sn*4, ground. Consequently relay S*ar* is operated; thus it is indicated that a register, namely LR1, has been connected to the SCC. By the opening of break contact *sa*1 another local register is prevented from being connected to the SCC. By the closure of contacts 1*ec*3 to 1*ec*14 the coded three digits of the called subscriber's number are transferred from the LR1 to the information storage circuit ISC of the SCC via the leads E'1–12. The units, tens and hundreds digits are each stored in the ISC on four relays (not shown) according to the following code 0 (0110); 1 (1111); 2 (0111); 3 (1011); 4 (0011); 5 (1101); 6 (0101); 7 (1001); 8 (0001) and 9 (1110). By the closure of make contacts 1*ec*15–16 the register finder RF1–2 connected to the SCC.

In the SCC contacts of the unit relays form an obvious circuit SU which has a single input, connected to ground via break contact *sn*3, and five outputs each connected to a battery through the winding of a relay 1S*mr*–5S*mr*, these relays being connected to the single input for the values 0,1; 2,3; . . . 8,9 of the units digits respectively.

Contacts of the tens relays form an obvious circuit ST1, which has a single input, connected to ground via said break contact *sn*3, and two outputs each connected to a battery through the winding of a relay 1S*fr*–2S*fr*, these relays being connected to the single input for the values 0 to 4 and 5 to 9 of the tens digits respectively.

Contacts of the hundreds relays form an obvious circuit SH which has a single input, coupled to ground via contacts *sn*2 and *se*4, and ten outputs which are connected to the single input for the values 1,2, . . . , 0 of the hundreds digits respectively. Each of the last mentioned ten outputs is connected to two make contacts of the relays 1S*fr* and 2S*fr* respectively.

Finally, contacts of the tens relays also form a second obvious circuit ST2 which has a single input, coupled to ground through contacts *sn*2 and *se*4, and five outputs which are connected to this single input for the values 0,5; 1,6, 2,7; 3,8 and 4,9 of the tens digits respectively. Each of the last mentioned outputs is connected to five make contacts of the relays 1S*mr* to 5S*mr* respectively.

The 1000 inlets of the terminal sections TS1–20 are numbered 100 to 149, 150–199, . . . 000–049, 050–099 respectively. Therefore the 20 contacts 1*sf*1, 2*sf*1, . . . , 2*sf*10 are connected via leads *s*1–20 to the winding of a corresponding relay 3T*br* in the terminal sections TS1–20 respectively. The 25 contacts 1*sm*1, . . . 5*sm*1; . . . 1*sm*5, . . . , 5*sm*5 are connected to the windings of the 25 electromagnets 1B*r*, 1H*r*, 2B*r*, 2H*r*, . . . 12B*r*, 12H*r*, 13B*r*. The electromagnet 13H*r* is not used.

It is supposed that the called line number 19 is stored in the information storage circuit ISC. In this case the circuit SU establishes a connection between its input and the winding of relay 5S*mr* and due to contact *sn*3 being closed relay 5S*mr* is energized; circuit ST1 establishes a connection between its input and the winding of relay 1S*fr* and due to contact *sn*3 being closed relay 1S*fr* is energized; circuit SH establishes a connection between its single input and its output 1 leading to the winding of relay 3T*br* of TS1; finally, circuit ST2 establishes a connection between its single input and its output 4 leading to the winding of electromagnet 13B*r* via closed contact 5*rm*5. Due to the units digit being equal to 9 (code 1110) the first units relay (not shown) is energized so that its change-over contact 1*su*2 is in its operative position. Consequently a connection is established between contact *se*3 and contact 3*tb*27 leading to the winding of electromagnet 14H*r*.

From the above it follows that the terminal section to which the called line belongs is indicated; indeed relay 3T*br* of TS1 is prepared for being energized. Also the horizontal select and supplementary bars associated to this called line are known since the electromagnets 13B*r* and 14H*r* are prepared for operation.

After the relays 1S*fr* and 5S*mr* have been operated the following circuit is established: battery in SCC, winding of relay S*er*, contacts 2*sf*11, 1*sf*11 and 5*sm*6, lead P to PCC, contact *ph*2, ground.

When the PCC is not in its active phase, as it is supposed, its relay P*hr* is not energized so that contact *ph*2 is then closed and relay S*er* operated in the last circuit, due to which the SCC can start its active phase. If the PCC is in its active phase the SCC has to wait until the PCC is released.

When relay S*er* is energized the relay 3T*br* of TS1 is operated as follows: ground in SCC, contacts *sn*2 and *se*4, circuit SH, output lead 1 of this circuit, contact 1*sf*1, lead *s*1 to TS1, winding of relay 3T*br*, battery. By the closure of the make contacts 3*tb*1 to 3*tb*27 the electromagnets 1B*r*, 1H*r*, . . . , 14B1, 14H1 in TS1 are prepared for operation. By the closure of make contact 3*tb*29 relay 2T*br* is energized as follows: battery, winding of relay 2T*br*, contact 3*tb*29, ground. By the closure of contact 2*tb*10 a ground is applied via leads *v*1 to *v*9 each to one of the two electromagnets controlling the supplementary bar in the respective primary sections PS1–9. For instance this ground is applied via lead *v*1 to one end of the electromagnet 14B*r* in the primary section PS1. By the closure of contacts 2*tb*11 to 2*tb*28 a ground is applied via contacts *ts*1,3; *ts*2,3; . . . ; *ts*18,3 of the electromagnets T*sr*1–18 of TS1 and leads *w'*1, *w''*2, . . . , *w'*9, *w''*9 to two electromagnets in each of the primary sections PS1–9. For instance this ground is applied via contacts 2*tb*11–12 and *ts*1,3–2,3 and leads *w'*1, *w''*1 to the one ends of the windings of the electromagnets 1B*r* and 2B*r* respectively.

Simultaneously the following circuit is established in PS1: battery in PS1, contacts 1B1, 1H1, . . . , 14B1, 14H1 of the respective electromagnets 1B*r*, 1H*r*, . . . , 14B*r*, 14H*r*, controlling the horizontal bars of crossbar switch PSS1, contact *cd*4, winding of relay C*cr*, lead J to the register finder RF1–2, crossbar switch contact Z, lead A′ to the local register LR1, contact *ec*15, lead B to SCC, contacts *sl*1 and *se*10, ground. Relay C*cr* is energized in this circuit if the above horizontal bars are in their rest position.

First the terminal section TS1 is now considered further. By the closure of not shown contacts *tc*14 of relay T*cr* and 3*tb*25 of relay 3T*br* the electromagnet 13B*r* of TS1 is energized as follows: battery, contact *tc*14, winding of electromagnet 13B*r*, contact 3*tb*25, lead *r*13,1 (not shown) to the SCC, contact 5*sm*5, circuit ST2, contacts *se*4, *sn*2, ground. Electromagnet 13B*r* is locked via the contacts 1B1 to 13B1. Electromagnet 14H*r* is energized as follows: battery in TS1, contact *tc*15, winding of electromagnet 14H*r*, contact 3*tb*27, lead *q*14,1 to SCC, contacts 1*su*2, *se*3 and *sn*1, ground. Electromagnet 14H*r* is locked through contacts 14H1 and *tc*16.

By the operation of the electromagnets 13B*r* and 14H*r* the 13th horizontal select bar and the supplementary bar of crossbar switch TSS1 are operated, this horizontal select bar having access to the local circuit LC50. Relay T*dr* is then energized via contacts 13B2 and 14H2 of the electromagnets 13B*r* and 14H*r* respectively.

Relay 3T*br* of TS1 is locked as follows: battery in TS1, winding of relay 3T*br*, contact 13B, lead *s*′1 to SCC, contacts *se*2, *sn*1, ground.

Relay S*jr* is then energized as follows: battery in TS1, contacts *tc*1, *td*3, lead O1 to SCC, contact *se*6, winding of relay S*jr*, ground. Relay S*jr* indicates in the PCC that a horizontal bar giving access to the called line has been operated in the selected terminal section, i.e. TS1.

The primary section PS1 is now considered. Therein the electromagnet 2B*r* is energized as follows, since during the preselection operation the electromagnet T*sr*1 of TS1 has already been energized, i.e. contact *ts*1,3 has been opened: battery in PS1, contact *cc*3, winding of electromagnet 2B*r*, lead *w*″1 to TSI, contacts *ts*2,3 of electromagnet T*sr*2 and 2*tb*12 of relay 2T*br*, ground. This electromagnet 2B*r* is locked via the contacts 1B1, 1H1 and 2*b*1. The electromagnet 14B*r* is energized in the following circuit: battery in PS1, contact *cc*16, winding of electromagnet 14B*r*, lead *v*1 to TS1, contact 2*tb*10, ground. By the operation of electromagnets 2B*r* and 14B*r* of crossbar switch PSS1 the second horizontal select bar and the horizontal supplementary bar thereof are both operated, this select bar giving access via a link to the second outlet of the crossbar switch TSS1. By the closure of contacts 2B2 and 14B2 of these electromagnets relay C*dr* is energized and in an analogous manner as described for the preselection operation relay C*cr* is released due to which relay S*kr* in the SCC is operated as follows: battery in PS1, contacts *cc*1, *cd*3, lead Z′1 to SCC, contact *se*7, winding of relay S*kr*, ground. The operated relay S*kr* indicates in the SCC that a horizontal bar has been operated in a primary section, i.e. in PS1. Relay S1*r* in the SCC is then energized in the following circuit: battery, winding of relay S1*r*, contacts *sj*3 and *sk*1, ground. Relay S1*r* indicates in the SCC that a horizontal bar has been operated in TS1 and PS1. It is locked via contact *s*13 connected in series with the parallel connected contacts *sj*2 and *sa*2.

In the meantime the terminal section TS1 informs the local register LR1 via the SCC whether the called line is free or busy. This register then decides if the selection operation has to be continued or not depending on this information and on the condition of the calling line. This is done in a manner which is not described since it does not form part of the invention. It is supposed that the selection has to be continued.

By the displacement of change-over contacts *s*11 in the SCC the following circuit is established: ground in the SCC, contacts *se*10 and *s*11; lead C to register LR1, contact *ec*16 and other not shown contacts in LR1, lead B′ to register finder RF1–2, crossbar switch contact Z, lead D′ to the local connecting circuit LCC1, lead K to primary section PS1, contact *fs*1 of electromagnet F*sr*, left hand winding of this electromagnet F*sr*, battery. The thus operated electromagnet F*sr* operates the non-operated associated vertical bar to which the local connecting circuit LCC1 is connected, i.e. the second vertical bar of cross-bar switch PSS1. Due to this the contacts Y′ (FIG. 3) are closed, these contacts interconnecting the local connecting circuit LCC1 and the inlet 2 to TS1.

Electromagnet F*sr* is locked as follows: battery, left and right hand windings of electromagnet F*sr*, contacts *fs*2 and *cs*4, ground. By the closure of make contact *fs*3 a ground is connected to wire *d*, due to which the associated electromagnet T*sr*2 (not shown) is energized in TS1 in an analogous manner as described for the preselection operation during which electromagnet T*sr*1 was energized. This electromagnet operates the second vertical bar of crossbar switch FSS1 due to which contacts X′ are closed. These contacts interconnect the outlet 2 of TSS1 with the inlet 50 thereof. A speech path is hence established from the calling to the called subscriber via the crossbar switch contacts X, Y, Y′ and X′, the interconnection between the contacts Y and Y′ being established in the local connecting circuit LC1 in a not shown but classical manner via a feeding bridge.

By the operation of electromagnet T*sr*2 the contact *ts*2,3 in TS1 is opened due to which electromagnet 2B*r* is released. Consequently relay C*dr* is released, followed by relay S*kr*. Due to the relay S1*r* being still operated, relay S*nr* is energized in the following circuit: battery, winding of relay S*nr*, contacts *s*14 and *sk*1, ground.

All the relays and electromagnets of TS1, PS1 and PCC, except the electromagnets T*sr*1, T*sr*2, C*sr* and F*sr*, are finally released and the SCC is disconnected from the register LR1. It should be noted that S*er* is the last relay to release, the closure of break contact *se* indicating that the SCC is again available for another selection operation.

In the above it has been described how a PCC has a passive operation phase and an active operation phase. During the passive operation phase it prepares the preselection operation of the calling line by designating the calling and priority terminal section and the suitable and priority primary section, whereas during the active operation phase it performs the preselection operation proper, i.e. it operates a select and an operate bar and blocks the SCC. The SCC also has a passive operation phase, during which it prepares the selection operation by decoding the information relating to the called line, and an active operation phase during which it performs the selection operation proper, i.e. it operates a select and an operate bar and blocks the PCC. The PCC and the SCC can operate simultaneously, except during their active phases, this being prevented by the inhibiting circuit P*hr*-S*er*. Hence, when a plurality of preselection and selection operations have to be performed, the average waiting time before such an operation can be performed is considerably reduced when compared with systems wherein one common control circuit is only able to perform a preselection operation or a selection operation one at the time. Consequently with the above described system the traffic capable of being handled is also considerably increased.

Instead of using a single common control circuit or marker it is further obviously also possible to use two or more such markers and in this case an inhibiting circuit has to be provided which is such that it prevents the various PCC's and SCC's to operate simultaneously during their active phases.

One may however still decrease the said average waiting time, and accordingly increase the traffic capable of being handled, by providing an inhibiting circuit which only prevents the PCC's and the SCC's to operate on a same crossbar switch. Such an inhibiting circuit is however more complicated than that used in the above described system.

In the above described switching system each local connecting circuit LCC is connected to two outlets of a same primary section crossbar switch. It should however be noted that each such circuit might as well have been connected to two outlets of different primary section crossbar switches.

Referring to FIGS. 2, 3, 6 and 8 to 12 an automatic PBX telephone switching system giving access to 3000 subscriber's lines is described in detail hereinafter. Hereby it should be noted that the elements of FIGS. 2, 3 and 6 represented in dotted lines should be reckoned with, whereas in FIG. 6 the lines cut by oblique lines and the right hand lower part should not be considered. The system described hereinafter is particularly characterized in that third switching stages are controlled by the common control circuits SCC1–3 also controlling the first and second switching stages.

Figure 8:
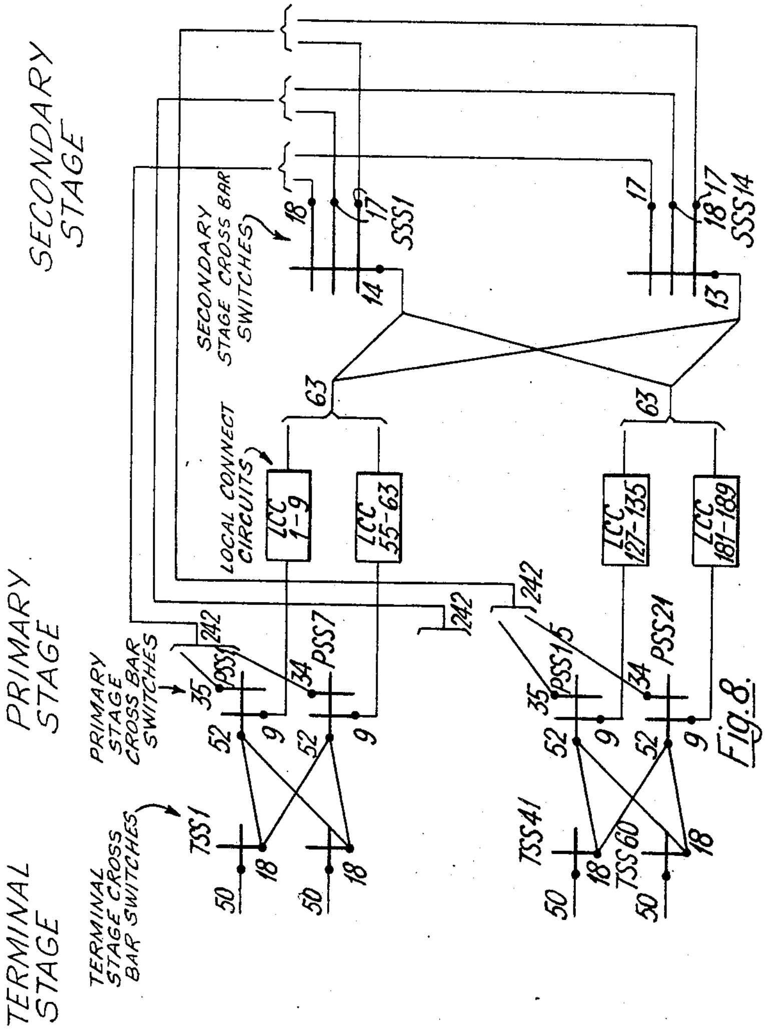
FIG. 8 is an interconnection scheme of the crossbar switches included in a three-stage telecommunication switching system according to the invention.

Principally referring to FIG. 8 this telephone switching system includes 3 groups of 1000 subscriber lines; 3 identical groups of 20 terminal section crossbar switches TSS1–20, TSS21–40 (not shown) and TSS41–60 each serving 1000 lines, 3 identical groups of 7 primary section crossbar switches PSS1–7, PSS8–14 (not shown) and PSS15–21, connected to the terminal section crossbar switches of a corresponding group of such switches, and a group of 14 secondary section crossbar switches SSS1–14 connected to all the primary section crossbar switches. Each terminal section crossbar switch has 52 inlets and 43 or 44 outlets, the latter outlets being divided in a group of 9 and in a group of 34 or 35 outlets; finally each secondary section crossbar switch has 13 or 14 inlets and 52 outlets. The 50 inlets of each terminal section crossbar switch are connected to the local circuits (not shown) of 50 subscriber lines. The 20×18 or 360 outlets of each group of 20 crossbar switches such as TSS1–20 are coupled to the 7×52 or 360 inlets of the associated group of 7 crossbar switches such as PSS1–7 through links. Since each primary section crossbar switch has 52 inlets it can be connected to 12 of the 20 crossbar switches TSS1–20 via 3 links and to 8 of these crossbar switches via 2 links. Of the 7 groups of 34 or 35 outlets of each group of crossbar switches such as PSS1–7 only 242 are used and connected to 242 inlets of the crossbar switches SSS1–14, namely to 18 inlets of 4 of these switches and to 17 inlets of 10 of these switches. The other 7×9 or 63 outlets of each group of crossbar switches PSS1–7, PSS8–14 (not shown), PSS15–21 are each connected to a local connecting circuit LCC1–63; LCC64–126 (not shown), LCC127–189. The 3×63 outlets of the 3 groups of 63 local connecting circuits LCC1–63, LCC64–126 (not shown), LCC127–189 are connected to corresponding inputs of the crossbar switches SSS1–14.

It should be noted that some inputs (not shown) of the third selector stage crossbar switches SSS1–14 are connected to outgoing trunks.

Figure 9:
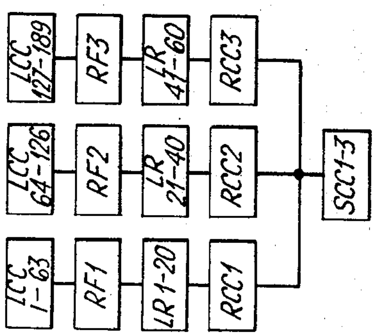
FIG. 9 represents an interconnection scheme between other parts included in this other system.

Principally referring to FIG. 9 the groups of local connecting circuits LCC1–63, LCC64–126 and LCC127–189 are also each connected to a corresponding register finder crossbar switch RF1–3 which has access to a group of 20 local registers LR1–20, LR21–40, LR41–60 respectively. The latter groups of local registers each have access to 3 selection control circuits SCC1–3 via a corresponding register concentrator circuit RCC1–3.

The terminal section, primary section and secondary section crossbar switches are each associated to an individual control circuit. A terminal section crossbar switch and its associated individual control circuit form a so-called terminal section; a primary section crossbar switch and its associated individual control circuit form a primary section; finally a secondary section crossbar switch and its associated individual control circuit form a secondary section. The switching system also includes 3 marker circuits each constituted by a preselection control circuit PCC (not shown) and one of the above mentioned selection control circuits SCC1–3, each marker circuit being associated to a group of 1000 subscriber lines. The preselection control circuit PCC is of the type shown on FIG. 5 and already described above.

Each primary section crossbar switch is connected to the 14 secondary sections crossbar switches SSS1–14 via 35 or 34 links. For instance the PSS1–4 are each connected to SSS1–14 via 35 links, whereas the PSS5–7 are each connected to SSS1–14 via 34 links. The 3×242 links extending from PSS1–21 to SSS1–14 are cyclically distributed over these SSS1–14. When considering the connection between the PSS1–7 and SSS1, for instance, and when the links are cyclically numbered, these PSS1–7 of the first 1000-group are connected to SSS1 via 18 links 1, 15, 29 of PS1; 8, 22 of PS2; 1, 15, 29 of PS3; 8, 22 of PS4; 1, 15, 29 of PS5; 9, 23 of PS6 and 3, 17, 31 of PS7. In an analogous manner the primary sections PSS8–14, PS14–21 of the other two 1000 groups are connected to SSS1 via 17 links namely 10, 24; 3, 17, 31; 10, 24; 3, 17, 31; 10, 24; 4, 18, 32; 12, 26 of PS8–14 respectively and 5, 19, 38; 12, 26; 5, 19, 33; 11, 26; 5, 19, 33; 13, 27; 7, 21 of PS15–21 respectively. The total number of links between PS1–21 and SSS1 is hence equal to 52. Likewise the total number of links between the PS1–21 and each of the SSS2–14 is also equal to 52.

Figure 10:
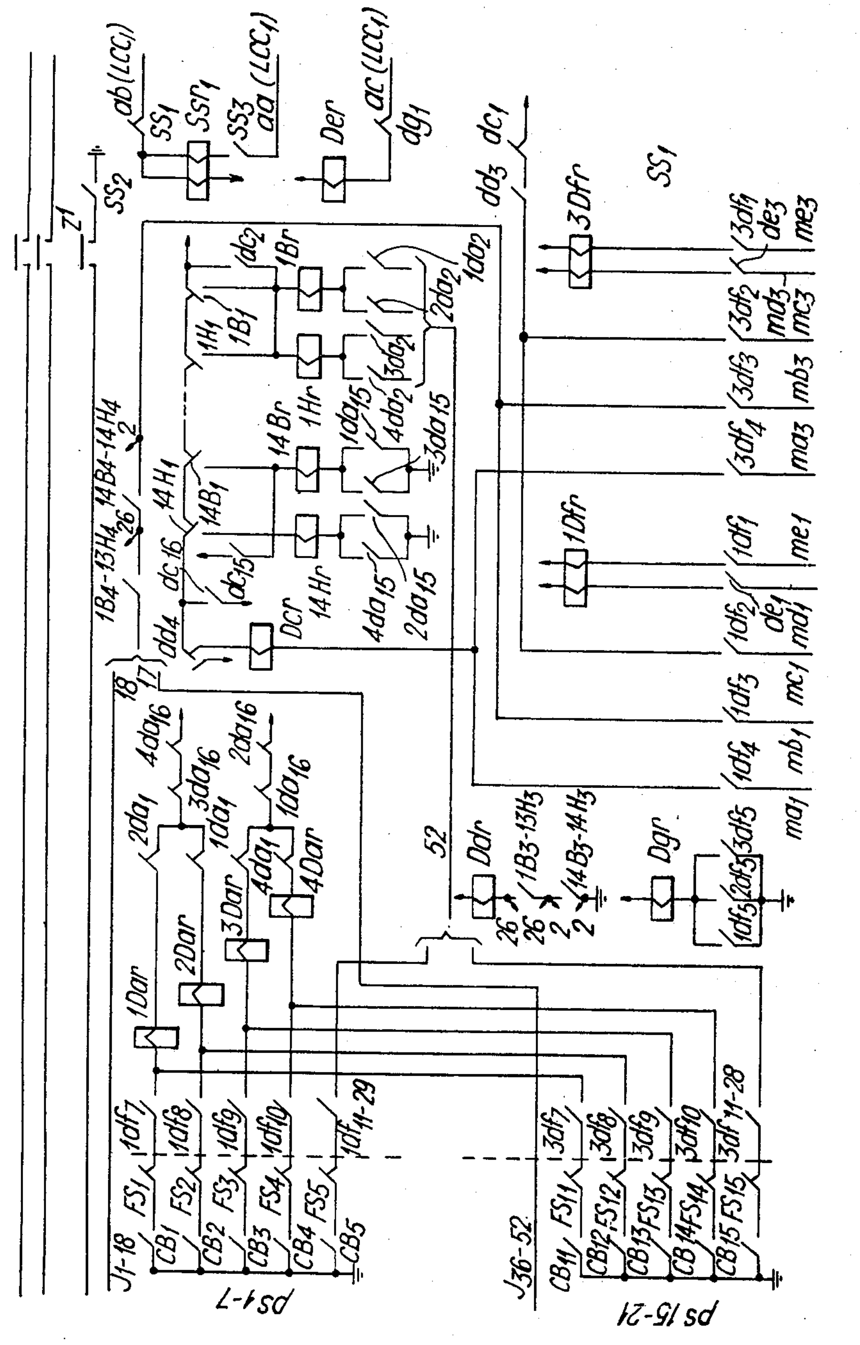
FIG. 10 shows a secondary section forming part of this other system.
Figure 11:
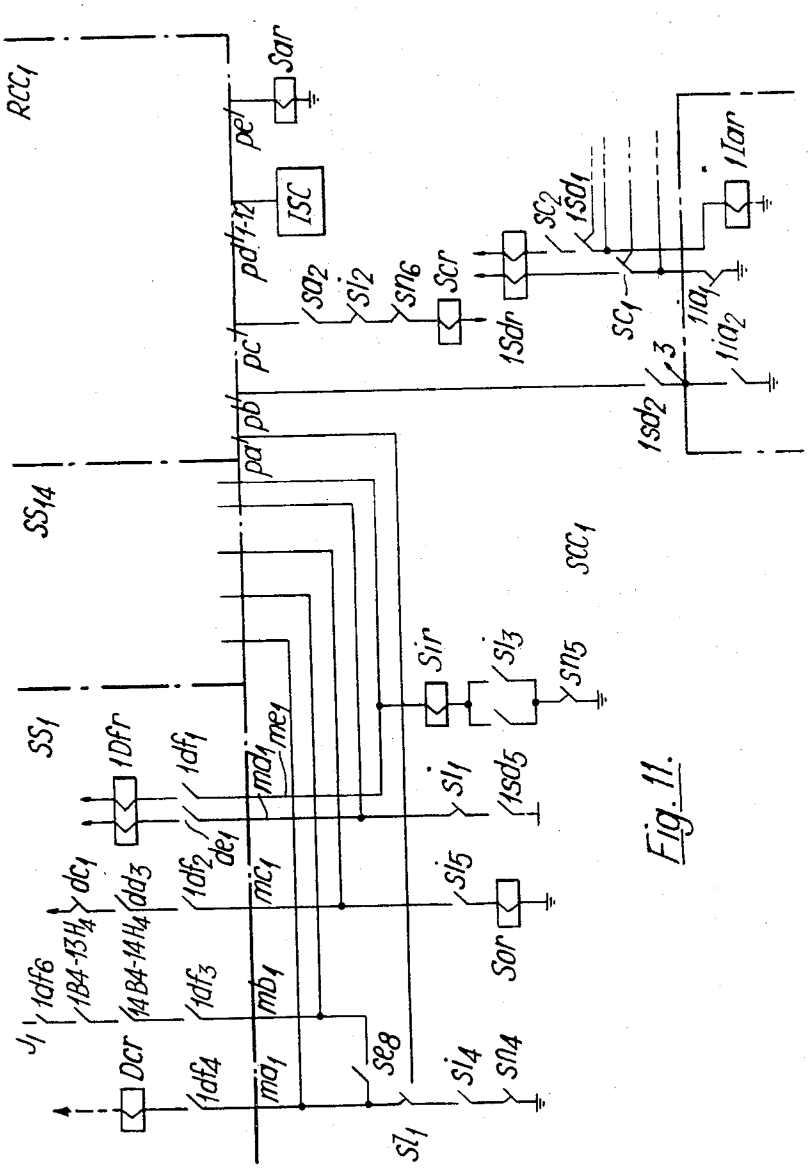
FIG. 11 represents part of a selection control circuit constituting together with the circuit of FIG. 6 the selection control circuit of this other system.
Figure 12:
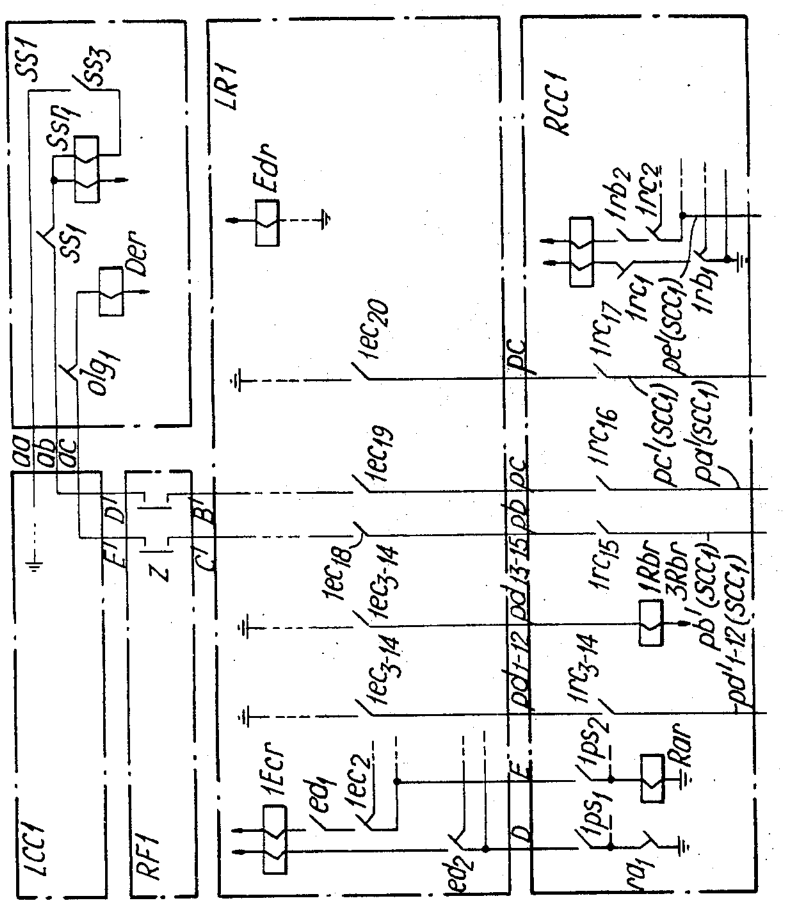
FIG. 12 represents interconnections between parts of this other system.

For each link extending between a primary section and a secondary section there is provided a connection between a ground and a relay 1D*ar*–4D*ar* in this secondary section (FIG. 10). As will become clear from the following each such connection includes a break contact of the electromagnet F*sr* controlling the vertical bar of the primary section to which the corresponding link is connected, a make contact of a relay C*br* included in this primary section, and a make contact of a relay 1D*fr*–3D*fr* of the secondary section. The closed and open positions of the above break contact of F*sr* indicates the free and busy conditions of the corresponding link respectively; the operation condition of relay C*br* indicates that the primary section has been seized; finally one of the relays 1D*fr*, 2D*fr*, 3D*fr* is operated depending on the group of primary sections PS1–7, PS8–14, PS15–21 to which this primary section belongs.

As mentioned above PS1 is coupled to SS1–14 via 35 links. The C*br* relay included in the primary section PS1 is C*br*1 (FIG. 3) with four contacts *cb*1, 1; *cb*1, 2; *cb*1, 3 and *cb*1, 4, whereas the 35 F*sr* electromagnets controlling the 35 links between PS1 and SS1–14 are F*sr*1, 1 to F*sr*1, 35 (not shown) each having a contact *fs*1, 1 to *fs*1, 35 respectively. The following corresponding connections are provided between a ground and a relay 1D*ar*–4D*ar* in SS1–14:

ground in PS1, contacts *cb*1, 4; 1, 1; 1, 2; contacts *fs*1, 2; tacts *fs*1, 1; 1, 15; 1, 29 of the electromagnets associated to the links 1, 15, 29, leads 1*ss*1, 1*ss*2, 1*ss*3 to SS1 (FIG. 10), contacts 1*df*7, 1*df*8, 1*df*9 of relay 1D*fr*, windings of relay 1D*ar*, 2D*ar*, 3D*ar* in SS1;

ground in PS1, contacts *cb*1, 4; 1, 1; 1, 2; contacts *fs* 1, 2; 1, 16; 1, 30 of the electromagnets associated to the links 2, 16, 30; leads 1*ss*4, 1*ss*5, 1*ss*6 to SS2, contacts 1*df*10, 1*df*7, 1*df*8 of relay 1D*fr*, windings of relays 1D*ar*, 2D*ar*, 3D*ar* in SS2. This connection is not represented but shows how the connections are systematically established;

ground in PS1, contacts *cb*1, 2; 1, 3; contacts *fs*1, 14; 1, 28 of the electromagnets associated to the links 14, 28; leads 1*ss*34; 1*ss*35 to SS14, contacts 1*df*8, 1*df*9 of relay 1D*fr*, windings of relay 1D*ar*, 2D*ar* in SS14 (this connection is also not shown).

Hence a ground in PS1 is coupled to the relays 1D*ar*, 2D*ar*, 3D*ar* of SS1 via the following connections: the first via contacts *cb*1, 1; *fs*1, 1; 1*ss*1 and 1*df*7, the second via contacts *cb*1, 2; *fs*1, 15 1*ss*2 and 1*df*8 and the third via contacts *cb*1, 3; *fs*1, 29; 1*ss*3 and 1*df*9. In an analogous manner a ground in PS2 is coupled to the relays 4D*ar*, 1D*ar*, of SS1 via the following connections *cb*2, 4; *fs*2, 8; 2*ss*4 and 1*df*10–*cb*2, 1; *fs*2, 22, 2*ss*1 and 1*df*7. A ground in PS3 is coupled to the windings of relays 2D*ar*, 3D*ar*, 4D*ar* of SS1 via the following connections; *cb*3, 3, *fs*3, 1; 3*ss*3 and 1*df*9, *cb*3, 4; *fs*3, 15; 3*ss*4 and 1*df*10; *cb*3, 1; *fs*3, 29; 3*ss*1; 1*df*8. A ground in PS4 is coupled to the winding of relays 1D*ar*, 2D*ar* of SS1 via the following connections: *cb*4, 2 *fs*4, 8; 4*ss*2 and 1*df*8–*cb*4, 3; *fs*4, 22; 4*ss*3; and 1*df*92. A ground in PS5 is connected to the windings of relay 3D*ar*, 4D*ar*, 1D*ar* of SS1 via the following connections: *cb*9, 1; *fs*5, 1; 5*ss*1 and 1*df*7–*cb*5, 2; *fs*5, 15; 5*ss*2 and 1*df*8–*cb*5, 3; *fs*5, 20; 5*ss*3 and 1*df*9. A ground in PS6 is connected to the windings of relay 2D*ar*, 3D*ar* of SS1 via the following connections *cb*6, 3; *fs*6, 9; *ss*6*ss*3 and 1*df*9–*cb*6, 4; *fs*6, 23; 6*ss*4 and 1*df*10. Finally a ground in PS7 is connected to the windings of relays 4D*ar*, 1D*ar*, 2D*ar* of SS1 via the following connections: *cb*7, 1; *fs*7, 3; 7*ss*1 and 1*df*7–*cb*7, 2; *fs*7, 17; 7*ss*2 and 1*df*8–*cb*7, 3; *fs*7, 31; 7*ss*3 and 1*df*9.

Likewise a ground in the primary sections PS8–14 is coupled to the relays 1D*ar*–4D*ar* of SS1 via *cb* contacts, contacts of the electromagnets associated to the links 10, 24; 3, 17, 31; 10, 24; 3, 17, 31; 10, 24; 4, 18, 32; 12, 26, 5 and contacts of relay 2D*fr*. Finally, a ground in the primary sections PS14–21 is coupled to the relays 1D*ar*–4D*ar* of SS1 via *cb* contacts, contacts of the electromagnets associated to the links 5, 9, 33; 12, 26; 5, 19, 33; 14, 26; 5, 19, 33; 13, 27; 7, 21 and contacts of relay 3D*fr*.

From the above it follows that each of the relays 1D*ar*–4D*ar* of SS1 is coupled to ground via a plurality of parallel connections each including a *cb* contact, an *fs* contact and a contact of 1D*fr*, 2D*fr* or 3D*fr*. For reasons of simplicity the various parallel connections leading to relay 1D*ar* of SS1 and including a contact of relay 1D*fr* are represented by the connection CB1, FS1, 1*df*7. In an analogous manner the various parallel connections leading to relays 2D*ar*–4D*ar* of SS1 and including a contact of relay 2D*fr* are represented by the connections CB2, FS2, 1*df*8–CB3, FS3, 1*df*9 and CB4, FS4, 1*df*10 respectively. Likewise the various parallel connections leading to relays 1D*ar*–4D*ar* of SS1 and including a contact of relay 3D*fr* are represented by CB11, FS11, 3*df*7–CB12, FS12, 3*df*8–CB13, FS13, 3*df*9–CB14, FS14, 3*df*10 respectively.

Each primary section includes a fifth *cb* contact which is coupled to each of the secondary sections SS1–14 via 3 or 2 leads depending on the fact that there are 3 or 2 links between this primary section and each of these secondary sections. For instance (FIG. 3) in PS1 contact *cb*1, 5 is coupled to SS1 via 3 contacts *fs*1, 1′; *fs*1, 15′; *fs*1, 29′ of electromagnets F*sr*1, 1; 1, 15; 1, 29 and leads 1*ss*36–38 and to SS14 via 2 contacts *fs*1, 14′; *fs*1, 28′ of electromagnets F*sr*1, 14; 1, 28 and leads 1*ss*69, 1*ss*70. Hence the primary sections PS1–7 are coupled to SS1 via 18 connections each including a *cb* contact and an *fs* contact. Likewise the primary sections PS8–14 and PS15–21 are coupled to SS1 each via 17 connections each including a *cb* contact and an *fs* contact. For simplicity these parallel connections are represented on FIG. 10 by CB5, FS5; CB10, FS10 (not shown); CB15, FS15. These 52 leads are each connected to one of the windings of the 26 electromagnets 1B*r* to 13H*r* via a contact of the corresponding D*fr* relay, 1D*fr* to 3D*fr*, and a contact of the relays 1D*ar* to 4D*ar* to which the corresponding contact of the F*sr* electromagnet is connected. For instance the lead connected to contact *fs*1, 1′ is connected to electromagnet 1B*r* via contact 1*da*2 of relay 1D*ar* since contact *fs*1, 1 is connected to the same relay 1D*ar*. In SS1 each of the contacts 1*df*3 to 3*df*3 is further connected to the 18, 17 and 17 leads J1–18, J19–35 and J36–52 respectively via one of the two contacts 14B4–14H4 and one of the 26 contacts 1B4–13H4. These leads J1–18, J19–35 and J36–52 are connected to the corresponding primary sections of the groups of primary sections PS1–7, PS8–14 and PS15–21 respectively. For instance leads J1 is connected to PS1 which is also connected to other J leads of other secondary sections, one such J lead being represented in dashed lines.

The preselection operation is completely identical to the one already described with relation to FIGS. 1 to 7 and will therefore not be repeated. During this preselection operation the calling subscriber's line is for instance connected to a local register LR1 through the terminal section crossbar switch TSS1, the primary section crossbar switch PSS1, the local connecting circuit LCC1 and the register finder RF1 (FIGS. 8, 9). Hereby the connection between LCC1 and LR1 (FIG. 12) is established via leads D′, E′, crossbar switch contacts Z of RF1 and leads B′, C′, the local connecting circuit LCC1 being permanently connected to an inlet of the secondary section crossbar switch SSS1.

The digits dialled by the calling subscriber are registered in the local register LR1 and when this operation is finished relay E*dr* (FIG. 12) of this register LR1 is energized in a not shown manner. The selection operation is then started. Due to the relay E*dr* being energized the left hand winding of relay 1E*cr* is connected to the register concentrator circuit RCC1 through contact *ed*2 and lead D. Other registers of the group LR2–20 may have registered a called subscriber's number and have the left hand winding of their relay 2E*cr*–20E*cr* (not shown) connected to the RCC1. These various relays 1E*cr*–20E*cr* form part of a lock-out circuit similar to SC3 shown on FIGS. 6 and 7. By this lock-out circuit, in only one of the 20 possible calling registers the associated relay 1E*cr*–20E*cr* is energized via break contact *ra*1 of relay R*ar*. It is supposed that register LR1 is the selected one, relay 1E*cr* being operated as follows: battery, left hand winding of relay 1E*cr*, contact *ed*2, lead D to RCC1, contacts 1*ps*1 and *ra*1, ground. Relay 1E*cr* is then locked in the following circuit: battery, right hand winding of relay 1E*cr*, contacts *ed*1 and 1*ec*1, lead E to RCC1, contact 1*ps*2, winding of relay R*ar*, ground. Consequently relay R*ar* is operated; thus it is indicated in the RCC1 that a register, namely LR1, has been connected to the RCC1. By the opening of break contact *ra*1 other registers of the group LR2–20 are prevented from being connected to RCC1.

When it is again supposed that the called subscriber's number is 11409, by the closure of contacts 1*ec*3–14 a ground is connected to the leads *pd*1–3, *pd*7–8, *pd*8–12 due to the code of the units, tens and hundreds digits being 1110,0011 and 1111, whereas by the closure of the contacts 1*ec*15 a ground is applied to the lead *pd*13 due to the called line number belonging to the first thousand group. By the closure of contacts 1*ec*18 and 1*ec*19 the register finder RF1 is connected to the RCC1 via wires B′, C′ and *pa*, *pb*, whereas by the closure of contact 1*ec*20 a ground is applied to lead *pc*, leading to the RCC1. All these connections are established via not shown contacts of LR1.

The relay 1R*br* is operated due to the ground on *pd*3. Since the thus operated relay 1R*br* indicates that the called subscriber belongs to the first thousand group, the RCC1 must be connected to the selection control circuit SCC1 associated to this thousand group.

By the closure of contact 1*rb*1 the relay 1R*cr* in the RCC1 tries to energize in the following circuit: battery, left hand winding of relay 1R*cr*, contacts 1*rc*1 and 1*rb*1, ground. In the other RCC2–3 the corresponding relay 1R*cr* may also try to operate. Therefore a lock-out circuit is provided between the relays 1R*cr* of the RCC1–3 in order that only one RCC1–3 should be connected to SCC1. Likewise lockout circuits controlled by relays 2R*br* and 3R*br* are provided between the relays 2R*cr* (not shown) and also between the relays 3R*cr* (not shown) of the RCC1–3 in order that only one RCC1–3 should be connected to SCC2 and SCC3 respectively. Only part of the lock-out circuit between the relays 1Rcr has been shown in FIG. 12.

When it is supposed that relay 1R*cr* of RCC1 is the one which remains energized, then this relay is locked in the following circuit: battery, right hand winding of relay 1R*cr*, contacts 1*rb*2 and 1*rc*2, lead *pe'* to SCC1 (FIG. 11), winding of relay S*ar*, ground. Consequently relay S*ar* is operated; thus it is indicated in the SCC1 that it has been connected to a register connecting circuit, here more particularly RCC1.

By the closure of contacts 1*rc*3–14 the leads *pd*12 are connected to the leads *pd'*1–12 so that the coded three digits of the called subscriber's number are transferred from the LR1 to the information storage circuit ISC of the SCC1. The units, tens and hundreds digits are each stored in the ISC on four relays according to the code given above. By the closure of contacts 1*rc*15 and 1*rc*16 the LCC1 is connected to the SCC1 via the leads D', E', the contacts Z of RF1, the leads B', C', the contacts 1*cc*19–18 of LR1, the lead *pa* and *pb*, the contacts 1*r*16–15 of RCC1 and the leads *pa'* and *pb'*. Finally, by the closure of make contact 1*rc*17 the ground present on lead *pc* is connected to lead *pc'* leading to SCC1 due to which relay S*cr* in SCC1 is operated as follows: ground in LR1, not shown contacts, contact 1*ec*20, lead *pc* to RCC1, contact 1*rc*17, lead *pc'* to SCC1, contacts *sa*2, *si*2, *sn*6, winding of relay S*cr*, battery. The operated relay S*cr* indicates in the SCC1 that SCC1 has been connected to a register, namely LR1.

By the closure of contact *sc*1 the relay 1S*dr* may try to operate in the following circuit (FIG. 11): battery in SCC1, left hand winding of relay 1S*dr*, contact 1*sc*1, contact 1*ia*1 in the selection intereference circuit SIC, ground. In the other selection control circuits SCC2–3 corresponding relays 2S*dr*–3S*dr* may also try to operate. Therefore the relays 1S*dr* of SCC1 and 2S*dr*–3S*dr* of SCC2–3 are interconnected in a lock-out circuit. When it is supposed that relay 1S*dr* is energized in the latter circuit then it is locked as follows: battery, right hand winding of relay 1S*dr*, contacts *sc*2 and 1*sd*1, winding of relay 1I*ar*, ground. Consequently relay I*ar* is energized.

The aim of the selection interference circuit SIC is to prevent more than one SCC from being connected to a secondary section, as will become clear from what follows.

By the opening of break contact 1*ia*1 the SCC2–3 are prevented from being connected to the SIC. By the closure of contact 1*ia*2 a ground is applied to the secondary section SS1 in the following circuit, this secondary section SS1 giving access to the LCC1 seized during the preselection operation: ground in SIC, contact 1*ia*2, contact 1*sd*2 in SCC1, lead *pb'* to RCC1, contact 1*rc*15, lead *pb* to LR1, contact 1*ec*18, not shown contacts in LR1, lead C' to register finder RF1, register finder crossbar switch contact Z, lead E' to LCC1, lead *ac* to SS1, contact *dg*1, winding of relay D*er*, battery. Due to this, relay D*er* in SS1 is energized, thus indicating that this secondary section SS1 is connected to a selection control circuit, more particularly to SCC1. By the closure of the contacts *dc*1–3 of which *dc*2 is not shown, the left hand windings of the relays 1D*fr*–3D*fr* included in the SS1 are connected to the SCC1–3 via the leads *md*1–3 respectively. Relay 1D*fr* connected to SCC1 is then energized as follows: battery in SS1, left hand winding of relay 1D*fr*, contact *de*1, lead *md*1 to SCC1, contacts *si*1 and 1*sd*5, ground. The operated relay 1D*fr* indicates in SS1 that SS1 and SCC1 have been interconnected.

The relays 2D*fr* and 3D*f* cannot be energized since the relays 2S*dr* and 3S*dr* are not operated, this being prevented by the selection interference circuit SIC.

Relay 1D*fr* is locked and relay S*ir* in SCC1 is operated as follows: battery in SS1, right hand winding of relay 1D*fr*, contact 1*df*1, lead *me*1 to SCC1, winding of relay S*ir*, contacts 1*sd*4 and *sn*5, ground. The operated relay S*ir* indicates in the SCC1 that SS1 and SCC1 have been interconnected. By the closure of contact 1*df*2 contact *dd*3 is connected to lead *mc*1, whereas by the closure of contact 1*df*3 the lead *mb*1 is connected to the contacts 14B4, 14H4 of the electromagnets 14B*r*, 14H*r* included in SSS1 and controlling the horizontal supplementary bars thereof. By the closure of contact 1*df*4 the winding of relay D*cr* is connected to lead *ma*1, whereas by the closure of contact 1*df*5 the relay D*gr* in SS1 is energized. By the opening of break contact *dg*1 the relay D*er* is released; thus SS1 is prevented from being seized by another SCC. By the opening of break contact *si*1 the operating circuit of relay 1D*fr* of SS1 is opened. By the opening of break contact *si*2 relay S*cr* in the SCC1 is de-energized. Consequently relays 1S*dr* and 1I*ar* are released by the opening of contact *sc*2 and relay I*ar* may again be operated by SCC2–3; by the opening of contact 1*sd*2 the SIC is disconnected from the SCC1. By the closure of make contact *si*3 the relay S*ir* is locked, whereas a ground is connected to the leads *ma*1 of the various SS1–14 via contacts *sn*4, *si*4 and *sl*1 due to which relay D*cr* is energized in SS1 in the following manner since only in SS1 relay 1D*fr* is energized: battery in SS1, series connected contacts 1B1 to 14H1 of the electromagnets 1B*r* to 14H*r*, contact *dd*4, winding of relay D*cr*, contact 1*df*4, lead *ma*1 to SCC1, contacts *sl*1, *si*4, *sn*4, ground. By the closure of make contacts *dc*2–15 the electromagnets 1B*r* to 14H*r* are prepared for operation. By the closure of make contact *si*5 the winding of relay S*or* is connected to the leads *mc*1 in the SS1–14. Finally a ground is applied to the circuit SH in SCC1 via contacts *sn*2 and *si*16.

As soon as the ISC of SCC1 has received the three digits (units, tens, hundreds) of the called subscriber's number, this number is decoded by means of the circuits SU, ST1, ST2 and SH. As mentioned above it is supposed that the called line number 149 is stored in the information storage circuit ISC. In this case the circuit SU establishes a connection between its input and the winding of relay 5S*mr* and due to contact *sn*3 being closed the latter relay 5S*mr* is energized; circuit ST1 establishes a connection between its input and the winding of relay 1S*fr* and due to contact *sn*3 being closed the latter relay 1S*fr* is energized; circuit SH establishes a connection between its single input and the contact 1*sf*1 coupled with relay 4T*br* of TS1; finally, circuit ST2 establishes a connection between its single input and the contact 5*sm*5 coupled with relay 13B*r* of TS1. Due to the units digit being equal to 9 (code 1110) the first units relay (not shown) is energized, so that its change-over contact *sn*2 is in its operative position. Consequently a connection is established between contact *se*3 and contact 3*tb*27 leading to the winding of electromagnet 14H*r*. From the above it follows that the terminal section to which the called line belongs is indicated; indeed relay 4T*br* of TS1 is prepared for being energized. Also the horizontal select and supplementary bars associated to this called line are known since the electromagnets 13B*r* and 14H*r* are prepared for operation.

When the relays S*ir* and 1S*fr* have been energized relay 4T*br* of TS1 is operated in the following circuit: battery in TS1, winding of relay 4T*br*, lead *ra*1 to SCC1, contact 1*sf*1, circuit SH, contacts *si*6 and *sn*2, ground. By the closure of contact 4*tb*1 an operating circuit for relay 3T*br* is prepared, whereas by the closure of contact 4*tb*2 the relay C*br* is energized in each of the primary sections PS1–7 to which the terminal section TS1 has access via a free link. For instance if at least one of the links between TS1 and PS1 is free, i.e., if e.g. make contact *ts*1,5 associated to the first vertical bar of TS1 is closed, relay C*br*1 of PS1 is operated in the following circuit: ground TS1, contacts 4*tb*2 and *ts*1,5, wire *ya* to PS1; winding of relay C*br*1, battery. Due to this relay 1D*ar* of SS1 tries to operate in the following circuit: ground in PS1, contacts *cb*1,1, *fs*1,1, lead 1*ss*1, contact 1*df*7, winding of relay 1D*ar*, contacts 2*da*1, 3*da*16, 4*da*16, battery. Other relays 2D*ar*–4D*ar* may try to operate but due to the existence of a lockout circuit comprising contacts 1*dal*–4*dal* and 1*dal*16–4*dal*6, only one of the relays 1D*ar*–4D*ar* can be energized. It is supposed that relay 1D*ar* is energized. By the closure of contacts 1*da*2 to 1*da*15 one of the electromagnets 1B*r* to 13B*r*, e.g. 1B*r*, and electromagnet 14B*r* are energized in SS1 due to the make contacts *dc*2 to *dc*15 of relay D*cr* being already closed. By the operation of electromagnets 1B*r* and 14B*r* of crossbar switch SS1, the first horizontal select bar and the horizontal supplementary bar thereof are both operated, this select bar having access via a free link to the first vertical bar of the crossbar switch PS1 i.e. the one associated to the electromagnet F*sr*1 having contacts *fs*1,1 to *fs*1,35 and *fs*1,1' to *fs*1,35'. Thus the PS namely PS1, giving access to TS1 and SS1 is indicated.

The electromagnets 1B*r* and 14B*r* are locked via contacts 1B1 and 14H1, 14S1, *dd*4 respectively. By the closure of contacts 1B3 and 14B3 of these electromagnets relay D*dr* is energized, due to which relay D*cr* is released. By the closure of contacts 1B4 and 14B4 and due to contact 1*df*3 being already closed, a connection is established between lead *mb*1 giving access to SCC1 and lead J1 giving access to PS1.

By the closure of contact *dd*3 relay S*or* in SCC1 is energized as follows: battery in SS1, contacts *dc*1, *dd*3, 1*df*2, lead *mc*1 to SCC1, contact *si*5, winding of relay S*or*, ground. Relay S*or* indicates in SCC1 that a horizontal bar has been operated in SSS1.

Relay S*er* (FIG. 6) in the SCC1 is then energized in the following circuit when the preselection control circuit PCC is in its passive phase: battery in SCC1, winding of relay S*er*, contacts *so*4, 2*sf*11, 1*sf*11 and 5*sm*5, lead P to PCC, contact *ph*2, ground.

When relay S*er* is energized the relay 3T*br* of TS1 is operated as follows: ground in S*c*C1, contacts *se*2 and 4*tb*1, winding of relay 3T*br*, battery.

The operation is then further continued in the same manner as desecribed in relation to FIGS. 1–7 as far as concerns the terminal section TS1. In this section, for instance electromagnets 13B*r* and 14H*r* controlling the 13th horizontal select bar and the supplementary bar of TSS1 are energized and locked, this horizontal select bar giving access to the local circuit LC50 (not shown).

By the closure of make contact *se*8 the following circuit is established: ground in SCC1, contacts *sn*4, *si*4, *s*11, *se*8, lead *mb*1 to SS1, contacts *lfd*3, 1B4, 14B4, 1*df*6 lead J1 to PS1, winding of relay C*cr*, contact *cd*4, series connected contacts 14H1, 14B1 .. . 1H1, 1B1, battery.

The relay C*cr* is energized in this circuit if the above horizontal bars are in their rest position. In an analogous manner as desecribed with relation to FIGS. 1 to 7, two electromagnets e.g. 1B*r* and 14B*r*, are operated in PS1 followed by relays S*kr* and S*lr*. By the displacement of change-over contact *s*11 the following circuit is established: ground in SCC1, contacts *sn*4, *si*4, *sl*1, lead *pa*' to RCC1, contact 1*rc*16, lead *pa* to LR1, contact 1*ec*13, other not shown contacts in LR1, lead B' to RF1, crossbar switch contact Z, lead D' to *lcc*1, lead *ab* to the secondary section SS1, contact *ss*1 of electromagnet S*sr*, left hand winding of electromagnet S*sr*1, battery. Consequently the electromagnet S*sr*1 in SS1 is operated, due to which it operates the associated vertical bar connected to LCC1 and hence closes the cross-bar switch contacts Z' between the already operated horizontal bar of SS1 and this vertical bar. Thus a connection is established between the local connecting circuit LCC1 and the primary section PS1 via contacts Z'.

Electromaget S*sr*1 is locked as follows: battery, left and right hand windings of electromagmet S*sr*1, contact *ss*3, ground in LCC1. By the closure of make contact *ss*2 a ground is connected to wire *d*, due to which the associated electromagnet F*sr*1 and PS1 is energized and locked via its contact *fs*2. This electromagnet operates the associated vertical bar of crossbar switch PS1 due to which the contacts Y' are closed between this vertical bar and the previously operated horizontal bar PS1 thus establishing an interconnection between the secondary section SS1 and the primary section PS1.

By the displacement of change-over contact *fs*1 the ground from SS1 is through-connected to TS1 due to which electromagnet T*sr*1 is energized in TS1. This electromagnet operates the associated vertical bar of TS1 due to which contacts X' are closed, thus establishing an interconnection between the primary section PS1 and the called subscriber.

A speech path is hence established from the calling to the called subscriber via the crossbar switch contacts S, Y, Z', Y' and X'.

The various relays, the operated vertical electromagnets excepted, are then released in a manner analogous to that described with relation to FIGS. 1 to 7.

From the above it follows that each of the selected control circuits SCC1–3 controls the first, second and third switching stages so that a considerable gain in material is obtained when compared with the known switching systems which includes a fourth switching stage and wherein the latter switching stage and the third switching stage are controlled by a group marker circuit.

While the principles of the invention have been described above in connection with specific apparatus, it is to be clearly understood that this description is made only by way of example and not as a limitation on the scope of the invention.

We claim:

1. An automatic telecommunications switching system for interconnecting calling and called lines, said system comprising switching means having a plurality of inputs and a plurality of outputs, a plurality of local circuits for connecting said lines to said inputs, a plurality of local connecting circuits, each interconnecting certain of said outputs, at least one common control arrangement for controlling the interconnection by said switching means of a calling of one of said lines to a called one of said lines, said last named interconnection occurring from one of said plurality of inputs connected to said calling line through said switching means, through a first of said outputs, the one of said plurality of said local connecting circuits connected to the first of said outputs, a second said outputs, and through said switching means to the called line through a selected one of said inputs, a plurality of registers for registering selection information, first connecting means including said local connecting circuits for establishing a connection between said output connected to said calling line and a free one of said plurality of registers, second connecting means for establishing a connection between said free register and said one common control arrangement to indicate to the said one common control arrangement the called input indicated by said selection information, said one common control arrangement comprising preselection control circuit means for controlling the interconnection of said calling input to said local connect circuits, and selection control circuit means for controlling the intreconnection of said local connecting circuits to the called one of said line circuits connected to said selected one of said inputs, and means in said first and second control circuits which operate simultaneously.

2. The automatic telecommunication switching system of claim 1 wherein each of said preselection and selection common control circuit means comprise both switch preparation means for selecting paths through portions of said switching means by preparing said switching means to operate and switch operating means for operating said prepared portions of said switching means, and first inhibiting means for inhibiting the switch operating means of said preselection and selection common control circuit means for operating said prepared portion of said switching means simultaneously.

3. The automatic telecommunications switching system of claim 2 wherein said switching means includes at least first and second switching stages, means for linking said first and second switching stages and means for connecting said preselection and selection common control circuit means to control the switches of each stage of the interlinked first and second switching stages.

4. The automatic telecommunications switching system of claim 3 characterized in this that said switching means further includes at least a third switching stage, means for coupling said third stage between the outlets of said second switching stage, and means connecting said third switching stage to be controlled by the selection common control means of the one common control arrangement associated to said first and second switching stages.

5. The switching system of claim 4 wherein said third switching stage comprises a plurality of third select bars, and another inhibiting circuit means for preventing said second common control circuit means from simultaneously performing the preparation operation on said same third select bar.

6. The automatic telecommunications switching system according to claim 4 wherein the switches of said first and second switching stages each comprise a plurality of first and second select bars, respectively, link means for linking the switches of said first switching stage with corresponding switches of said second switching stage, in such a manner that each of the switches of said first switching stage has access to each of the switches of the second switching stage via at least one of said link circuits, and said third switching stage having a plurality of switches, connecting circuit means for connecting first outlets of said second switching stage to the inlets of said third switching stage via the local connecting circuit means so that each switch of said second switching stage has access to each of the switches of said third switching stage via at least one of said local connecting circuits, register means, means for connecting each of said second switching stage to said registered means, and means for coupling outlets of said third switching stage to outlets of said second switching stage so that each of the switches of said third switching stage has access to each of the switches of said second switching stage.

7. The automatic telecommunications system according to claim 6 wherein means are provided in said selection control circuit means for selecting a third select bar coupled with said local connecting circuit seized by said preselection control circuit, means for selecting the one of said first select bar to which the called input belongs, means for selecting one of said second select bars having access simultaneously to said selected first and third select bars, and means for operating the thus selected of one of said third select bars said seized connecting circuit to the output belonging to the selected one of said second select bars, and means for operating the selected first and second select bars, in order to interconnect said output to said called input.

8. The telecommunications switching system according to claim 3 wherein first and second switching stages each comprise a plurality of crossbar switches, said switches each having a plurality of select bars, and means in said inhibiting means for preventing said preselection and selection common control circuit means from acting to cause the operation of the same select bars.

9. The automatic telecommunications switching system of claim 8 wherein said switching means include a first switching stage comprising a plurality of first crossbar switches, a second switching stage comprising a plurality of second crossbar switches, and wherein said link means comprises link circuit means linking said first stage to said second stage in such a manner that each of said switches of said first stage has access of each of said switches of said second stage via at least one link circuit means.

10. The automatic telecommunications switching system according to claim 9 wherein said control circuit means comprises means for selecting the first stage select bar to which a calling input belongs, means for selecting a second stage select bar having access simultaneously to the selected first stage select bar via a free one of said link circuits, and to a free one of said registers via a free one of said local connecting circuits, and means for operating the first and second select bars selected during said first operation in order to interconnect said calling input to said free connecting circuit which is connected by said local connecting means to a said free register.

11. The automatic telecommunications switching system according to claim 9 wherein said selection control circuit means comprises means for selecting the first select bar to which a called input belongs, means for operating the free one of said second select bars connected to the local connecting circuit selected by said preselection control circuit means, and means for operating the first, select bar selected during said first operation of said selection control circuit means, in order to interconnect said seized local connecting circuit to said called input.

References Cited

UNITED STATES PATENTS 2,585,904 2/1952 Busch ............... 179—18

OTHER REFERENCES

Precis of Patent 2,585,904, copy in 179–18 with the patent.

WILLIAM C. COOPER, Primary Examiner